United States Patent [19]

Wilder et al.

[11] Patent Number: 4,613,269

[45] Date of Patent: Sep. 23, 1986

[54] ROBOTIC ACQUISITION OF OBJECTS BY MEANS INCLUDING HISTOGRAM TECHNIQUES

[75] Inventors: Joseph Wilder, Princeton; Rajarshi Ray, Plainsboro, both of N.J.

[73] Assignee: Object Recognition Systems, Inc., Princeton, N.J.

[21] Appl. No.: 584,539

[22] Filed: Feb. 28, 1984

[51] Int. Cl.[4] ............................................. G06F 15/46
[52] U.S. Cl. ................................... 364/513; 364/478; 358/101; 358/903; 414/730; 901/14; 901/31; 901/34; 901/47
[58] Field of Search ................ 364/513, 478; 318/640, 318/568; 358/88-91, 100-101, 139, 903; 414/730, 732, 738; 901/14-18, 31, 34, 46-47

[56] References Cited

U.S. PATENT DOCUMENTS

| | | | |
|---|---|---|---|
| 3,804,270 | 4/1974 | Michaud et al. | 214/16 B |
| 4,017,721 | 4/1977 | Michaud | 364/513 X |
| 4,146,924 | 3/1979 | Birk et al. | 364/513 |
| 4,305,130 | 12/1981 | Kelley et al. | 364/513 |
| 4,344,146 | 8/1982 | Davis, Jr. et al. | 364/552 |
| 4,402,053 | 8/1983 | Kelley et al. | 364/513 |
| 4,412,293 | 10/1983 | Kelley et al. | 364/513 |
| 4,443,855 | 4/1984 | Bishop et al. | 364/513 |
| 4,486,842 | 12/1984 | Hermann | 364/513 |
| 4,539,703 | 9/1985 | Clearman et al. | 364/513 X |

OTHER PUBLICATIONS

"Three Vision Algorithms for Acquiring Workpieces from Bins", by Robert B. Kelley, et al., *Proceedings of the IEEE*, vol. 71, No. 7, Jul. 1983, pp. 803-820.

*Primary Examiner*—Gary V. Harkcom
*Attorney, Agent, or Firm*—Carl V. Olson

[57] ABSTRACT

A robotic apparatus and method of acquiring jumbled objects or workpieces from a bin, and transferring them to a final site, or to an intermediate site for quality inspection. A video camera system produces a video signal representing a brightness image of the jumbled objects. An intermediate amplitude range of the video signal is selected, expanded, stored, and quantized into digital pixels. A computer enhances the image using histogram techniques, performs edge suppression, performs repeated shrinking with progressively-increased pixel thresholds until an area limit is reached, performs clustering of closely-spaced pixels, and commands movement of the robot gripper to a computed grip site on a recognized object. The gripper may limit its gripping pressure as a function of the deformation of the object gripped.

30 Claims, 26 Drawing Figures

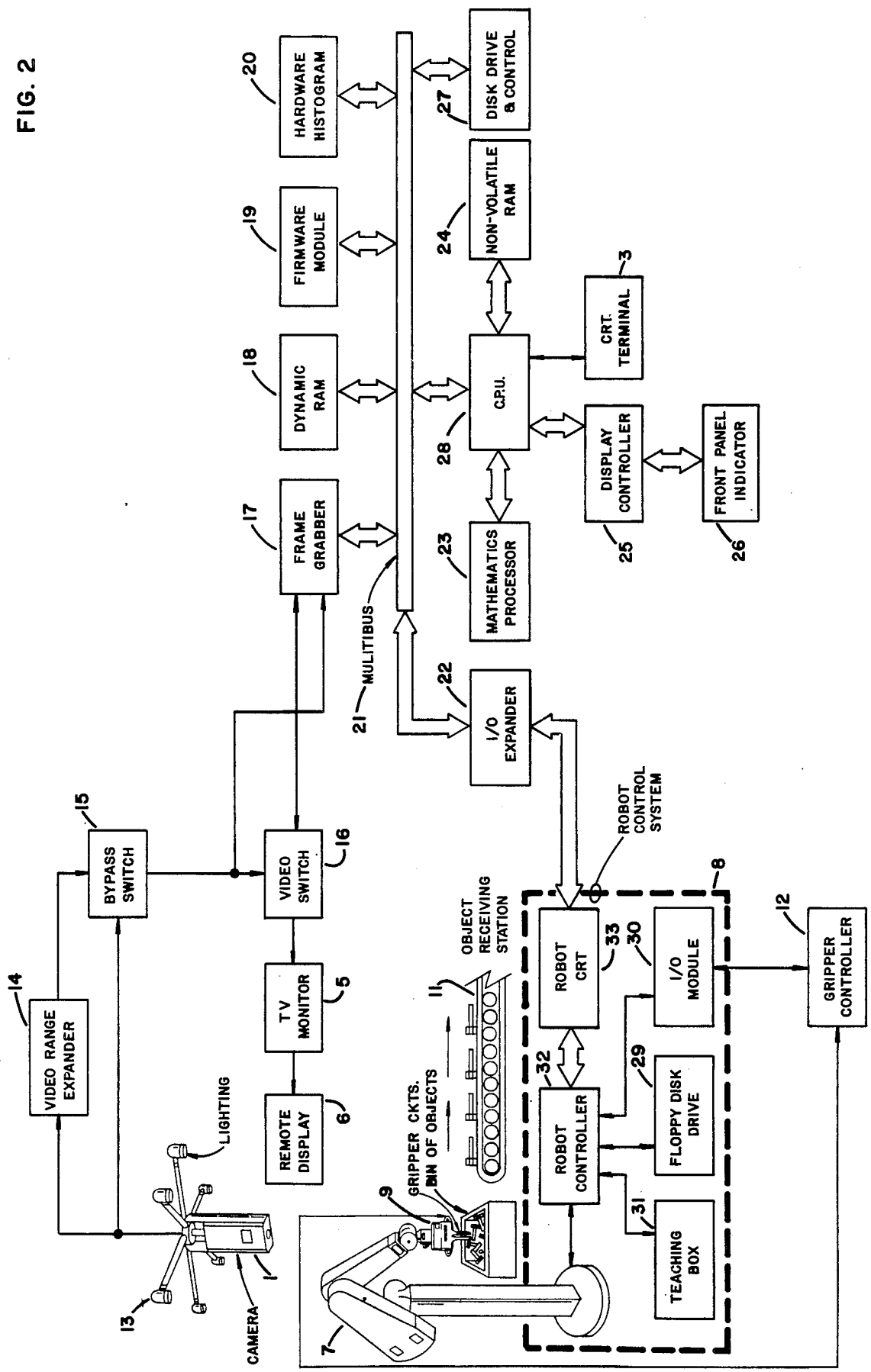

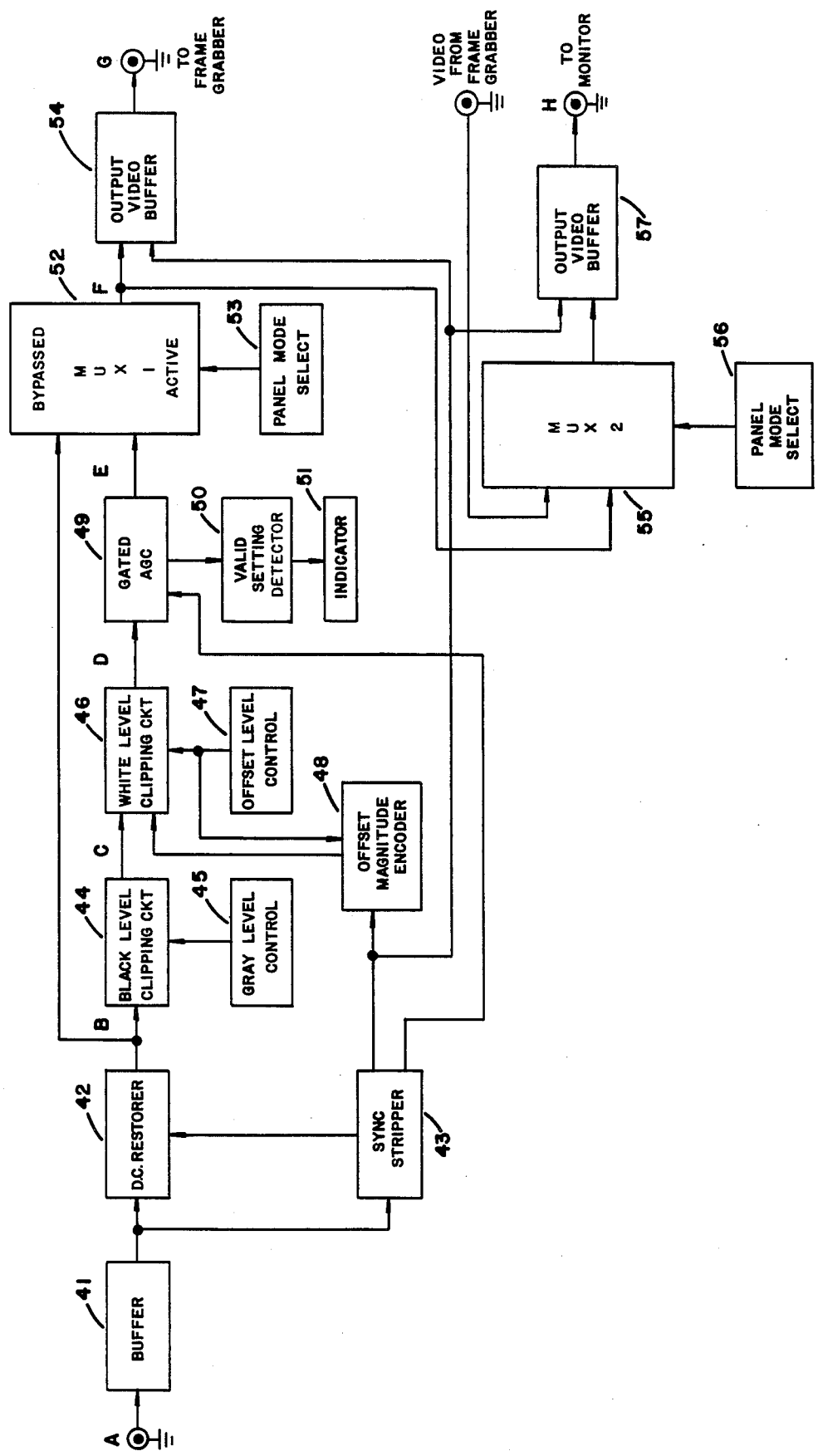

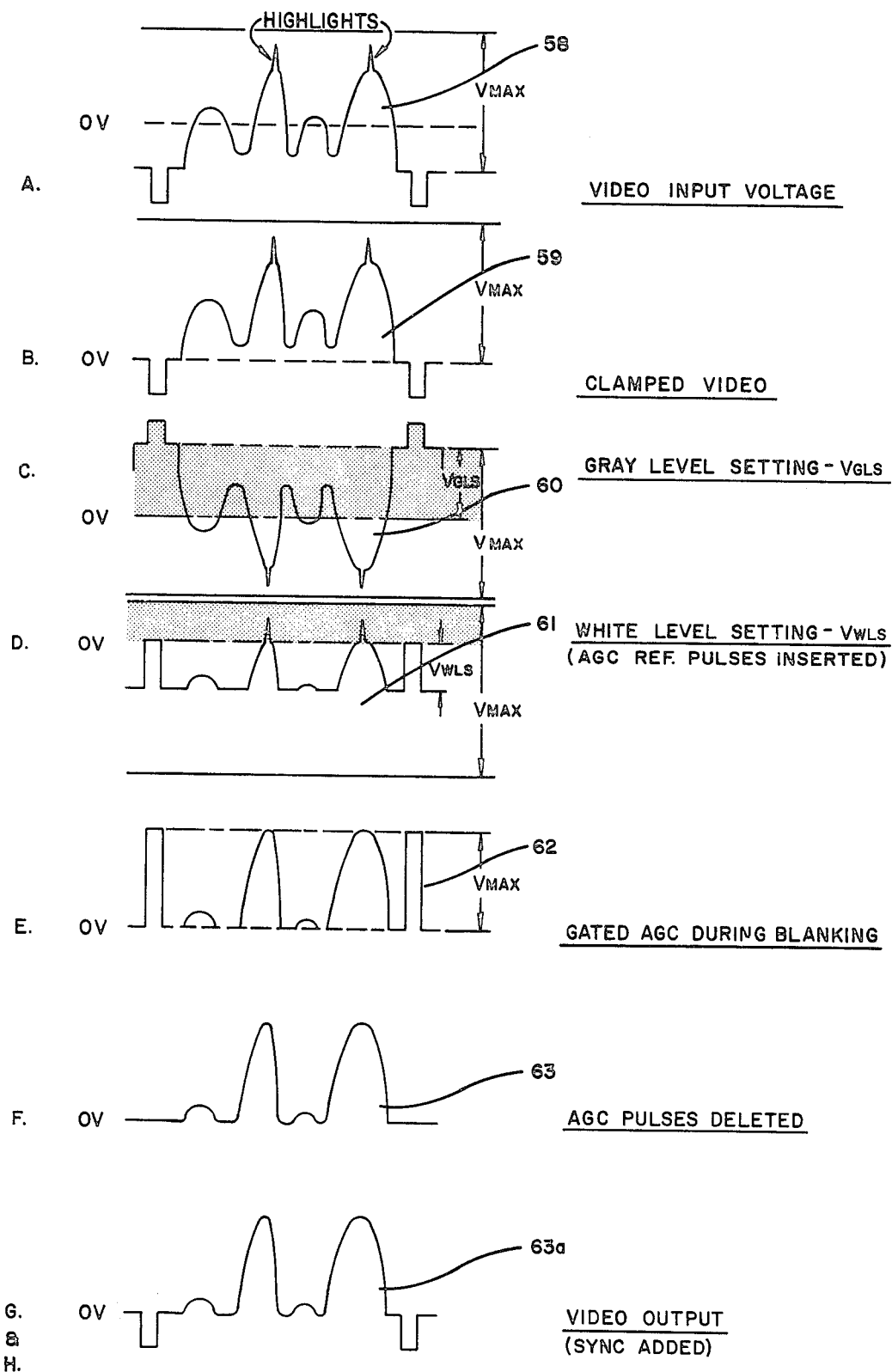

NOTE: IF Y(X) > Y(X+1)
Y(X) > Y(X-1)
Y(X) IS CHOSEN AS PEAK

T = THRESHOLD = $X_1 + K(X_2 - X_1)$

K TYPICALLY VARIES FROM APPROXIMATELY 0.6 TO NEAR 1, BUT UNDER UNUSUAL CONDITIONS MAY HAVE A GREATER RANGE.

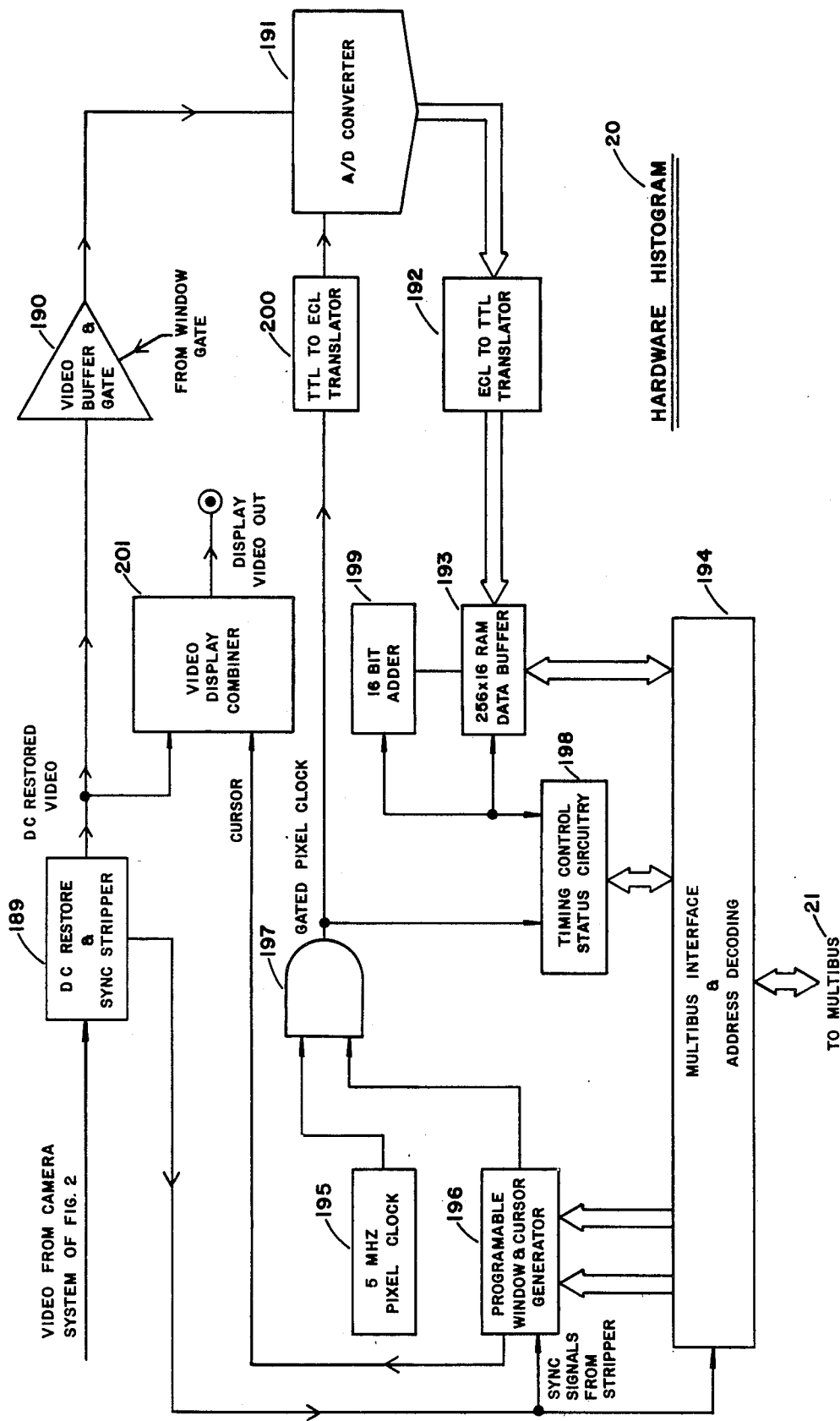

TOTAL SYSTEM FLOWCHART

TRAINING FLOWCHART

OPERATIONAL FLOWCHART

PART 117 OF FIG. 7A EXPANDED

TO 118 FIG. 7A

COMPARISON OF BINARY AND GRAY SCALE ADAPTIVE THRESHOLD DATA SEGMENTATION

FIG. 9

ORIGINAL IMAGE /156

```
10 10 10 10 10 10 10 10 10 10  10 10 10 10 10 10 10 10
10 13 10 10 20 20 20 15 15 15  20 20 20 20 10 10 10 10
10 10 10 20 20 20 20 20 15 20  20 20 20 20 10 10 10 10

10 10 20 20 30 30 30 30 20 20  30 30 30 30 30 10 10 10
10 20 20 30 30 40 40 30 20 20  30 40 40 30 30 20 20 20
10 20 20 20 30 40 40 30 20 20  30 40 40 30 20 20 10 10
10 10 20 20 30 30 30 30 20 10  30 30 30 30 10 10 10

10 10 10 10 20 20 20 20 20 20  20 20 20 10 10 10 10
10 10 10 10 10 10 20 20 15 20  20 20 10 10 10 10 10 10
10 10 10 10 10 10 10 10 10 10  10 10 10 10 10 10 10 10
```

CONVENTIONAL /157
1st ITERATION - THRESHOLD = 18

```
0 0 0 0 0 0 0 0 0 0 0 0 0
0 0 0 1 0 0 0 0 0 1 1 0 0
0 0 1 1 1 0 0 0 1 1 1 1 0
0 1 1 1 1 1 1 1 1 1 1 1 0
0 1 1 1 1 1 1 1 1 1 1 1 0
0 0 0 1 1 1 1 1 1 1 1 1 0
0 0 0 0 0 0 0 0 1 0 0 0 0
0 0 0 0 0 0 0 0 0 0 0 0 0
```

ADAPTIVE THRESHOLD GRAY SCALE /159
1st ITERATION - THRESHOLD = 18

```
0  0  0  0  0  0  0  0  0  0  0  0  0
0  0  0  20 0  0  0  0  0  20 20 0  0
0  0  30 30 30 0  0  0  30 30 30 30 0
0  30 30 40 40 30 20 20 30 40 40 30 0
0  20 30 40 40 30 20 20 30 40 40 30 0
0  0  0  30 30 30 0  0  0  30 30 0  0
0  0  0  0  0  0  0  0  0  0  0  0  0
0  0  0  0  0  0  0  0  0  0  0  0  0
```

2nd ITERATION - THRESHOLD = 18 /158

```
0 0 0 0 0 0 0 0 0 0 0 0 0
0 0 0 1 0 0 0 0 1 1 0 0
0 0 0 0 1 1 1 1 1 1 1 0 0
0 0 0 0 0 0 0 0 0 0 0 0 0
```

2nd ITERATION - THRESHOLD = 25 /160

```
0 0 0 0 0 0 0 0 0 0 0 0 0
0 0 0 40 0 0 0 0 0 40 40 0 0
0 0 0 0 40 0 0 0 0 0 0 0 0
0 0 0 0 0 0 0 0 0 0 0 0 0
```

1) $t_{i-1} = 0$
IF 1 OR MORE OF $S_i$, $S_{i-1}$, $S_{i-2}$ ARE LESS THAN T

2) $t_{i-1} = S_{i-1}$ IF ALL THREE ARE GREATER THAN OR EQUAL TO T

INPUT = $S_i$   i = INDEX OF VIDEO SAMPLE SEQUENCE
OUTPUT = $t_i$

ROBOTIC ACQUISITION OF OBJECTS BY MEANS INCLUDING HISTOGRAM TECHNIQUES

BACKGROUND OF THE INVENTION

In today's industries, there is a tremendous need for sensor guided robots for material handling and assembly. The first step in any assembly task is to acquire a part from a bin or pallet or other source of supply. Strategies are needed for automating this parts-acquisition process using industrial robots. Providing vision and tactile sensing to a robot can aid in object recognition, in-transit inspection, and increase the handling or assembly speed by eliminating the need for blind search. The alternative to vision is inflexible, often expensive fixturing, which is at odds with the fundamental justification for a robot, namely its programmability. This is especially important in batch manufacturing environments, where a robot can easily be adapted to accommodate batch to batch variations in shapes and sizes of the product. Over 70% of the products manufactured in the U.S. are produced in batches. The ultimate in robot flexibility and one with the least amount of fixturing incorporates visual and tactile sensing to remove unoriented objects from a bin.

The following U.S. patents provide additional background information: U.S. Pat. No. 3,804,270, issued on Apr. 16, 1974 to J. A. Michaud et al., U.S. Pat. No. 4,305,130, issued on Dec. 8, 1981 to R. B. Kelley, et al., U.S. Pat. No. 4,344,146, issued on Aug. 10, 1982 to R. E. Davis, Jr., et al., and U.S. Pat. No. 4,402,053, issued on Aug. 30, 1983, to Robert B. Kelley, et al.

SUMMARY OF THE INVENTION

According to an example of the invention, a robotic apparatus and method is provided for acquiring jumbled objects or workpieces from a bin and transferring them to an intermediate or final site. A video camera system produces a video signal representing a brightness image of the jumbled objects. After an intermediate amplitude range of the video signal is selected and expanded, the signal is quantized into digital pixels. A computer enhances the image of pixels by retaining pixels above a threshold intensity computed from an intensity histogram of the image. Adjacent pixels of greatly different brightnesses are recognized as being at edges of an object and are suppressed. The pixel image is further repeatedly shrunk by suppressing pixels which have (or are adjacent to pixels which have) a brightness less than a predetermined threshold, which is successively increased until the remaining total bright area of the image falls below a predetermined proportion of this original image. Bright pixels are added to spaces between nearby bright pixels to form clusters of pixels. The clusters having more than a predetermined area are identified as objects to be acquired and transferred to a predetermined site.

BRIEF DESCRIPTION OF THE DRAWINGS

FIG. 2 is a block diagram of the total acquisition system of FIG. 1;

FIG. 3A is a circuit diagram of a video range expander which serves to efficiently increase the gray scale resolution of the object acquisition system;

FIG. 3B is a plot of video waveforms at various circuit stages of the circuit of FIG. 3A showing means for amplitude resolution and gray scale enhancement;

FIG. 4C is a diagram of a hardware circuit for computing histograms;

FIG. 9 is an illustrated comparison of image pixels in the conventional binary, fixed threshold, image data segmentation system, and an improved gray-scale, varying-threshold, system of image data segmentation;

DETAILED DESCRIPTION

Figure 1:
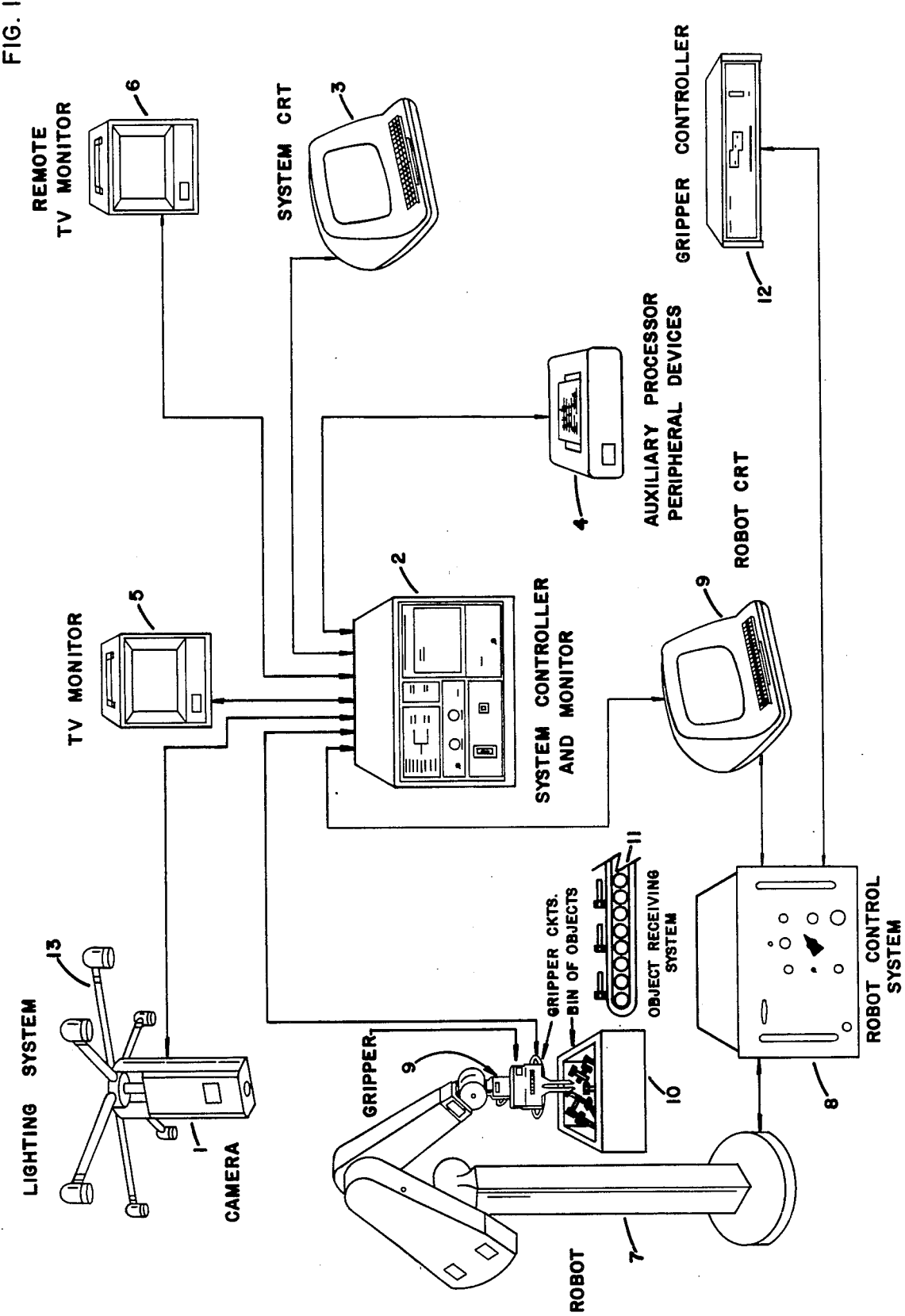
FIG. 1 is a pictorial view of a combined robotic and electro-optical system whose purpose is to automatically acquire at high speed from a bin or other container diverse objects which may be randomly oriented and touching, or separated from each other, and deliver them to an object receiving station for further processing.

Referring now in greater detail to the drawing, in FIG. 1 a video camera 1 scrutinizes a bin of randomly oriented objects 10 which are illuminated by a set of adjustable lights 13 to produce an image which is fed to the system controller 2 and which may be observed by TV monitors 5 and 6. The system cathode ray tube terminal 3 is connected to the controller and serves to input instructions and observe the status of various program sequences. Auxilliary processor peripherial devices 4, such as printers, external storage, etc., are also connected to the system controller. A robot 7 and its controller 8 are directed by the robot CRT 9 and are fed processed signals from the system controller to acquire objects from the bin 10 and place them on a production line 11 by means of gripper 9 and its controller 12.

FIG. 2 is a block diagram of the total system. Here, the output of camera 1 is fed to the video range expander 14 which is shown in detail in FIG. 3A. A bypass switch 15 allows the video signal to bypass the video range expander for initial adjustment of the system. The output of switch 15 is fed to a video switch 16 by means of which the direct video signal is viewed on monitors 5 and 6, or the stored image output of a frame grabber 17 is viewed by the monitors. A multibus 21 provides the common channel which carries the information to and from a dynamic ram 18, ROM 19, the hardware histogram circuitry 20, disk drive equipment 24, a non-volatile RAM 27, and a central processor (CPU) 28. To speed up processing, the CPU 28 has an auxilliary mathematics processor 23 and includes a CRT terminal 3, a display controller 25 and a front panel indicator 26 on the system controller 2. An I/O expander 22 is connected to the multibus to provide adequate bandwidth for the signals fed to the robot control system 8. This consists of a robot controller 32 and its CRT terminal 33 and a floppy disk 29 for storage of instructions, a teaching box 31 which provides the means of the robot 7 instruction set-up and test, and an I/O module 30 used to drive the gripper controller 12. This is connected to the gripper 9 and provides bidirectional information to detect and grasp an object and to indicate its continued presence until deposited on the production line 11. With the use of an electric gripper, the level of pressure on the object is limited to avoid crushing the fragile objects.

FIG. 3A shows a block diagram, and FIG. 3B shows important waveforms, of the video range expander 14, whose function is to provide electronic magnification of significant portions of the desired video signal derived from the camera which is viewing the objects of interest in the bin. In addition, it minimizes or completely removes undesirable scene background reflections thereby attaining an improved image. The magnification function serves to multiply, by a controlled factor, the effective range of gray levels which are limited by the frame grabber specification which, for example, may be a 6 bit unit, to effectively accomplish in performance something approaching an 8 bit unit. This is attained by the use of two controllable clipping circuits 44 and 46, and the background or baseline gray level control 45 and the peak white or offset control 47. After these two controls are manually set at the front panel by observing the video on the monitor after the lighting has been adjusted for optimum results, the gated automatic gain control (AGC) 49, whose magnitude is determined by the offset magnitude encoder 48, adjusts the amplification to provide a switchable normalized level of video to either the frame grabber 17 and/or the system monitor 5. The synch stripper 43 separates sync from the incoming video and feeds it to various circuits of FIG. 3A.

Referring to the circuit of FIG. 3A and the waveforms of FIG. 3B, a typical waveform 58 is shown at A, which may include highlight peaks which can limit the dynamic range of desirable video for edge detection of the objects of interest. The signal is first clamped to ground or 0 level by DC restorer 42 in FIG. 3A, resulting in waveform 59 shown at B in FIG. 3A. This is followed by the level clipping circuit 44, which is adjusted by the gray level control 45, resulting in the waveform 60 shown at C. All information darker than this setting is ignored in further data processing, with the result that significant information is accentuated and undesired data is minimized. The white level clipping circuit 46, adjusted by the offset control 47, produces waveform 61 at D. In the next stage, the AGC pulse portion of waveform 62 is used to normalize the level of the slice by a gated AGC circuit 49 which operates during the blanking portion of the video cycle so as not to interfere with the video itself. The valid setting detector 50 and indicator light 51 insure that the above adjustments are proper. This is followed by removing the AGC pulses, as shown in waveform 63 at F, and reinserting the normal synch and blanking pulses in the output video buffers 54 and 57 to produce the standard video waveform shown in waveform 63a at G and H. This waveform is fed from G to the frame grabber 17, and from H to the monitor 5. Multiplexer MUX 1 52, actuated by panel mode select switch 53, provides a choice of expanded video or normal video (bypassed video range expander), to the frame grabber. Multiplexer MUX 2 55, in conjunction with a second panel mode select switch 56, provides a choice of viewing either the expanded range video or the stored image from the frame grabber on the monitor.

Figure 4B:
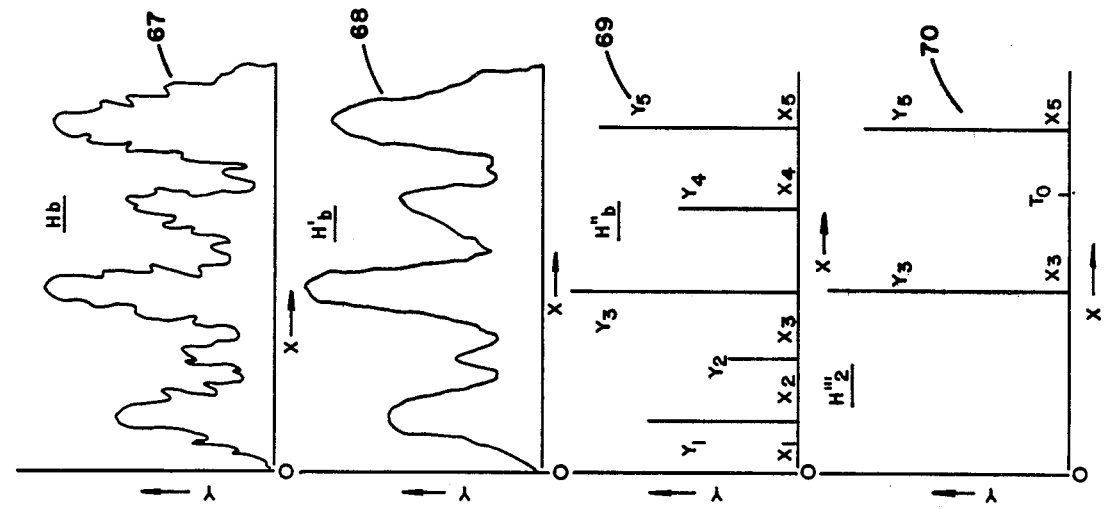
FIGS. 4A and 4B illustrate two examples of histograms and their use in computing adaptive thresholds.
Figure 4A:
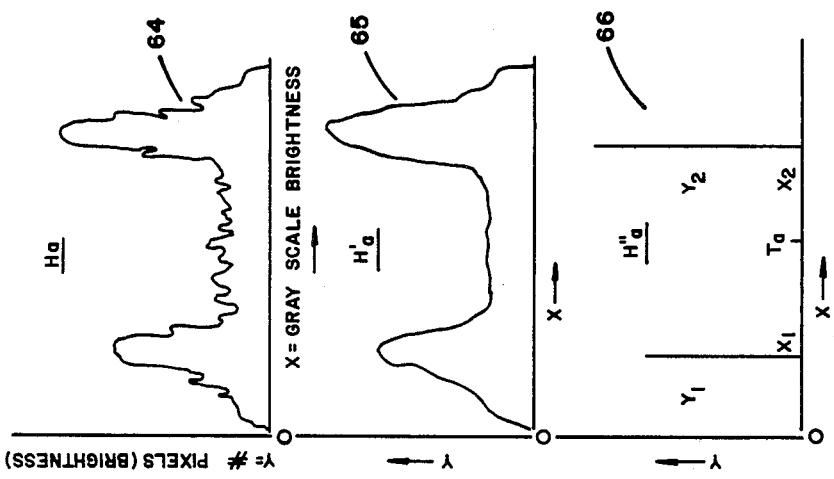

Reference is now made to FIGS. 4A, 4B, and 4C for a description of adaptive thresholding using an intensity histogram.

An intensity histogram can be used to determine the starting threshold of an iterative data segmentation process as well as ascertain the status of overall scene illumination. A two-dimensional data segmentation technique is used in one implementation for acquiring parts from a bin using a robot. If the initial setting of a threshold for this iterative shrinking mechanism is not optimum, many iterations must be performed before the process converges to the desired results. Another problem commonly encountered is the random fluctuations in intensity of ambient illumination. If a preset threshold is used over a long period of time, the system performance would depend on the degree of fluctuation in ambient lighting.

In order to solve the above problems, an intensity histogram can be made by analyzing the scene within a window. The bi-modal distribution of an intensity histogram depicts the nature of scene illumination and the reflection characteristics of workpieces. For bright objects on a dark background, two clear peaks can be obtained. One peak corresponds to shadows cast by jumbled workpieces on one another and the background, while the other peak corresponds to reflection from the brightly illuminated workpieces. In this case, the initial threshold should be selected at a point between the two peaks but closer to the brighter peak, as judged during the training phase. Such a judicious choice of starting threshold can speed up the process significantly.

It is advantageous, therefore, that a histogram of a window-scene should be made for every pick-up cycle. Since histograms depend on scene lighting, and spatial distribution and reflection characteristics of workpieces, the threshold will change when any of these factors change. Thus, the initial threshold for the data segmentation process can be selected in a more significant and adaptive manner as described herein.

This histogram can be created using either software or hardware techniques and can be modified before the determination of a threshold. In the present example, the histogram generator is implemented in hardware, as shown in FIG. 4C, to enhance the speed of the system. The histograms at 64 and 67 in FIGS. 4A and 4B are smoothed as shown at 65 and 68 to make the threshold selection much easier to accomplish. For example, the histogram can be smoothed by convolving it with a $3 \times 1$ element (one-dimensional) averaging filter, generally each element having the same weight.

As shown in FIG. 4A, histogram $H_a$ 64 incorporates an ordinate y=number of pixels of a given brightness, and the abscissa x=gray scale of light intensity, generally shown in binary form with two major peaks. The left one represent shadows and the right one strong reflections of the incident light as well as some ripples due to random reflections from the jumbled objects. When this histogram data is filtered to minimize the ripples so as to more clearly identify the desired two peaks, histogram H'a at 65 results. The latter is then processed to determine the y(x) amplitude which has y(x+1) and y(x−1) both less in amplitude than y(x), thus identifying y(x) as a peak. It is then shown as a single line in H"a at 66. In a similar fashion, FIG. 4B shows a histogram Hb of an illuminated object which has a variety of reflection surfaces and black or gray background, therefore having many peaks. The signal appears as $H_b'$ at 68 after filtering, as $H_b''$ at 69 after peak detection, and as $H_b'''$ at 70, after an ordering of the magnitude of the various peaks, the two largest peaks y₃ and y₅ being selected. The threshold $T_o$ is usually adjusted between x₃ and x₅ to optimize the selectivity between individual objects. In $H_a$ it is seen that y₁ is the dark peak and y₂ is the bright peak. The threshold $T_o$ is derived by experiment during the training phase as follows:

$$T_o = X_D + K(X_L - X_D)$$

where $X_D$=dark peak location
$X_L$=light peak location
K=contrast factor

K may vary from 0.3 to 1.0 depending on the light situation, the surface quality of the object and the optimum performance obtained during the training phase but under unusual conditions may have a greater range (e.g., to 1.25). Equipment actually constructed used a value of K equal to 0.9.

The function of the hardware histogram generator in FIG. 4C is to take a window gated area within a field of video data and accumulate the number of times each resulting intensity value has occurred. By this means a histogram, which is a representation, as shown in FIG. 4A and 4B, of this intensity distribution, can be derived. In FIG. 4C video data which is generated by camera 1, as shown in FIG. 2, is passed through a D.C. restorer 189 and a window gated video buffer 190 and fed to an A/D converter 191. This device translates the analog video signals into an eight bit binary data stream. The window circuitry, which is programmable both manually and automatically in advance through the computer, gates which areas of this incoming video stream will be included in the histogram data and which will be ignored.

When the digital video data within the selected window output from 192 is detected in a 256×16 RAM data buffer 193 its binary value is used as an absolute address to the memory and the resulting location within the RAM is incremented by one. This process continues over the entire windowed field of view, When completed, each location of the RAM represents one of 256 possible intensity values and the data within this location represents the number of pixels of this intensity which have occurred. The RAM can then be accessed through the multibus interface 194 by the host computer 28 for analysis of the histogram data. The width of the histogram memory is 16 bits to accommodate the worst case condition where a 256×256 pixel window contains all the same intensity values (65,536 in the exemplary equipment).

In FIG. 4C, there is additional circuitry for a pixel clock 195, gated by a programmable window outline and cursor generator 196 for display purposes, in "AND" gate 197, and video sync generation circuitry 189. Further circuits include timing control 198, a sixteen bit adder 199, and a TTL to ECL translator 200 which drives the A/D converter 191. The resulting histogram signals are fed to the system multibus 21 as shown in FIG. 2. A video display combiner 201 allows the viewing of the window gated pictorial information to be viewed on the monitor.

Figure 5:
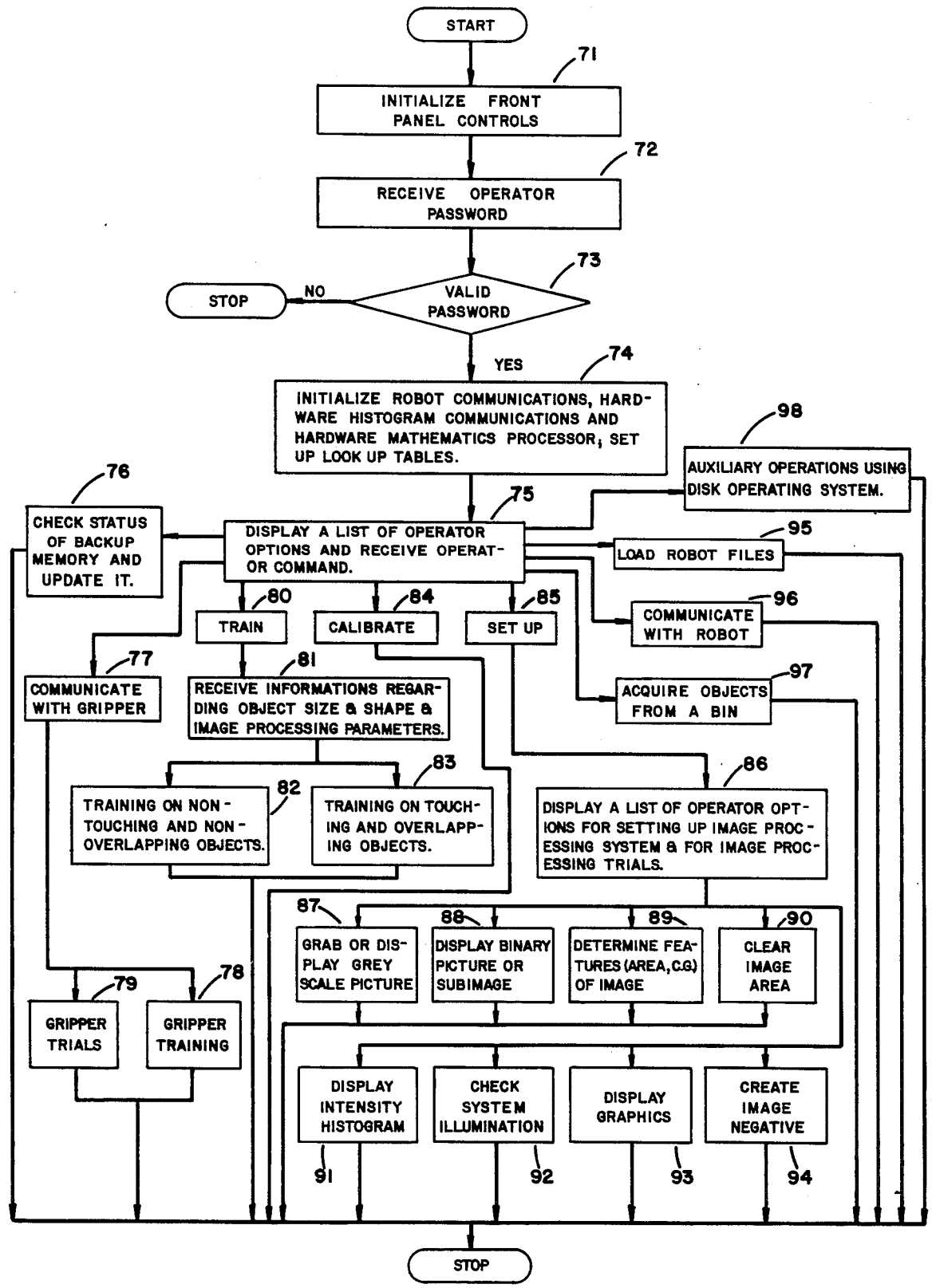
FIG. 5 is a flowchart of the total system illustrating the various functions which can be performed including system setup and display, testing, system initialization, training and operation.

Reference is now made to FIG. 5 for a description of a total system flowchart which includes eight sequential operations as follows:

Operation 1 (boxes 71, 72, 73, and 74) initializes all the processes including the vision system and robot system. "Reset" turns on all indication lights as a check of their operation.

Operation 2 (boxes 75 and 76) checks the status of the vision backup memory and updates it. Selecting D on keyboard displays on the monitor the contents of the backup memory.

Operation 3 (boxes 75 and 84) provide for calibration of the total system. Scale factors are pixels/mm, and offsets between camera and robot in linear and angular coordinates. This data is placed in backup memory.

Operation 4 (boxes 75, 85, 86, 87, 88, 89, 90, 91, 92, 93, 94) is the setup and display of key functions to check for proper operation as for example: the proper lighting, indicator lights, bypassed and active video range expander, adjust gray level and offset controls to optimize separation of objects in contact, to adjust brightness, and prevent circuit overload.

Figure 6:
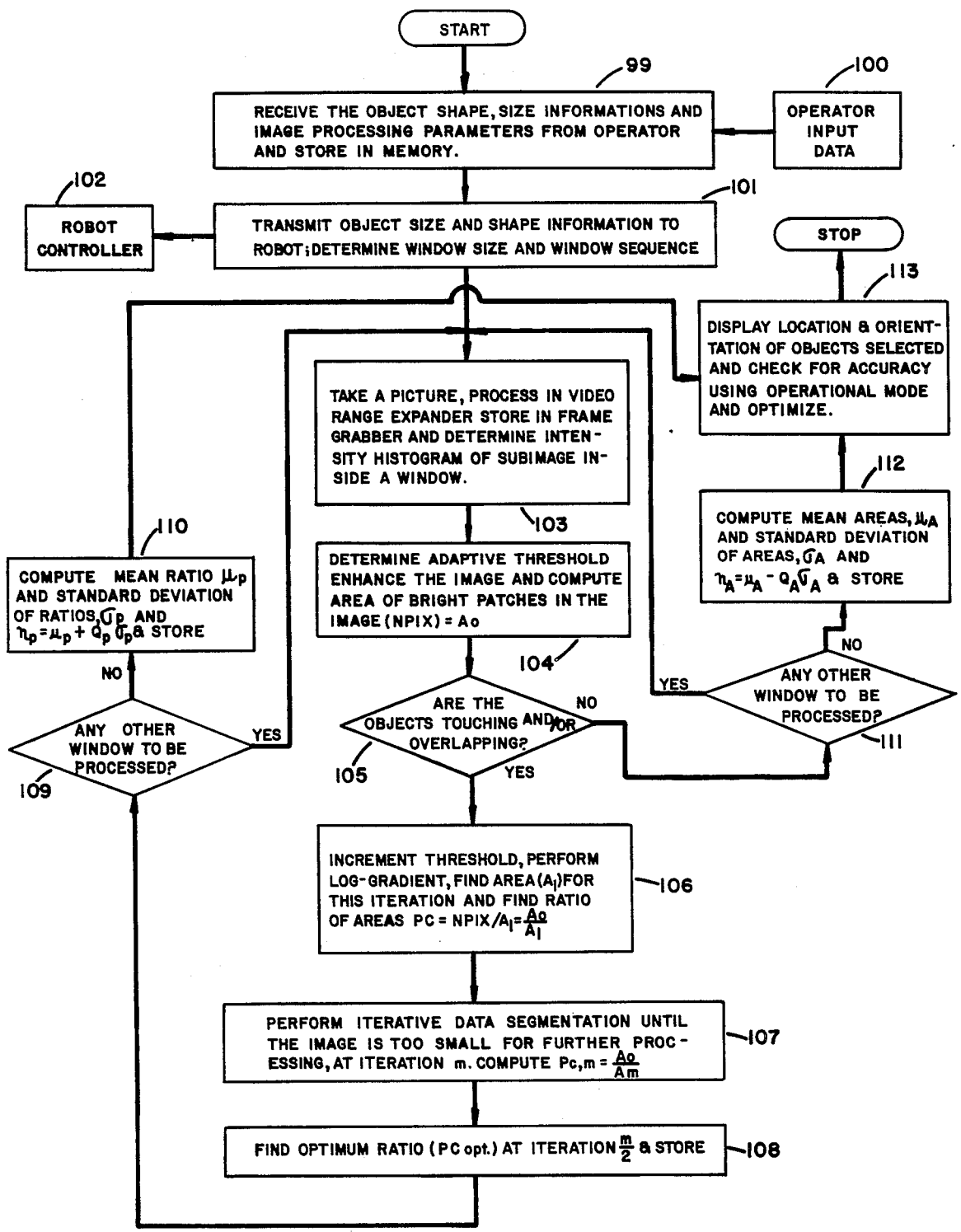
FIG. 6 is a flowchart describing the operation of the system during the automatic training phase.

Operation 5 (boxes 75, 80, 81, 83) is the training system described in the flowchart of FIG. 6 for touching or overlapping objects. The train light indicator is activated.

Operation 6 (boxes 75, 77, 78, 79) communicates with the gripper. In the electronic gripper it stores the data on dimensions of objects to be acquired and the desired pressure. In the pneumatic gripper it allows manual adjustment of the jaw separation to fit the objects to be acquired.

Operation 7 (boxes 76, 80, 81, 82) is the training system described in the flowchart of FIG. 6 for non touching or overlapping objects. The train light indicator is activated.

Figure 7A:
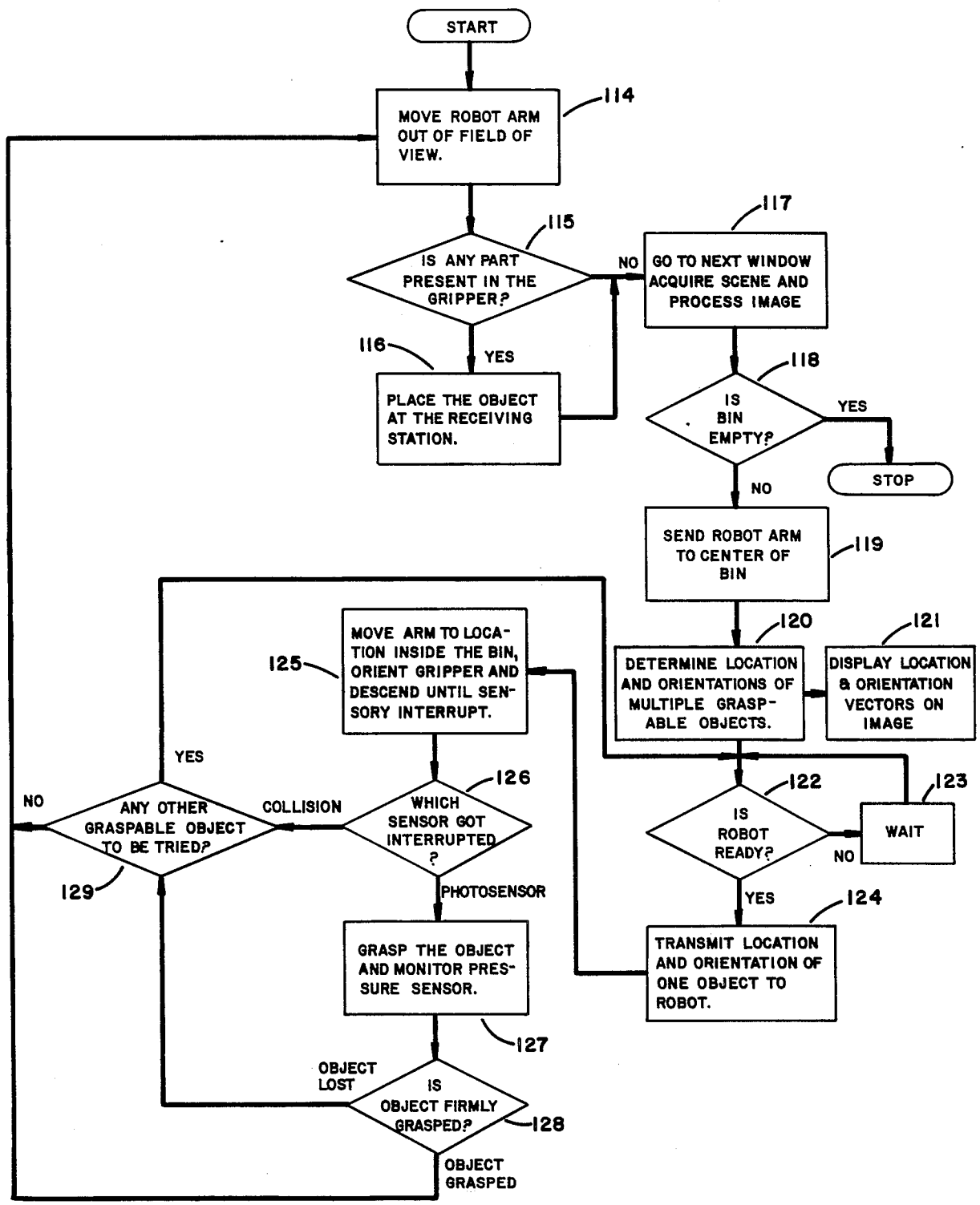
FIG. 7A is a flowchart describing the overall operational phase including communication with the robot.

Operation 8 (boxes 75, 95, 96, 97) is the operation system and acquires objects from the bin, as described in flowchart of FIGS. 7A, B, and C. The "acquire" light is activated as are alternate activation of the robot and vision lights on the front panel. The duration of the "on" cycle of each light is determined by it's data processing time. Each time an object is acquired and placed in a production receiving line, a new window is imposed on the objects in the bin, the process of data segmentation and object selection is carried on and the object location and orientation as transmitted to the robot at which time the robot panel light comes on.

Operation 9 (boxes 75, 98) allows operation of the system with programs stored on a disk feeding the multibus in place of the EPROM 19 as a source. FIG. 6 is a training flowchart showing what is included in the box 80 in the total system flowchart of FIG. 5. Important parameters such as communication with the robot hardware histogram circuits, the mathematics processor and the main processors are initialized for training the system for objects which are separated, touching or overlapping. FIG. 6 describes the various steps from 99 through 113 to instruct the system and store information in a non-volatile memory for use in the automatic operation mode shown in FIGS. 5, 7A, 7B, and 7C. The operator, shown as operator input data at 100, provides by means of panel controls and the CRT terminal, the important image processing parameters 99 essential to the system operation. These include, for example:

Spatial distribution of objects in the bin (e.g., touching/non-touching).

Maximum number of objects to be selected in a window,

Maximum number of times the empty bin is to be scanned before system is shut down.

Intensity coefficient desired.

Intensity difference at the edges of touching objects.

Minimum clustering distance and area to attain object coherence.

The number of windows to be used for training data.

Choice of bright objects on dark background or vice-versa.

Number of frames to be used for averaging on the frame grabber.

Coordinates of camera and robot locations.

Size and shape of objects in bin.

Maximum allowable gripper pressure on the object (object fragility).

At 101, the program, having used this data, determines the window size and sequence and sends the size and shape information to the robot controller 102. In 103, the camera 1 feeds a picture of the surface of the bin containing the objects. The vision controller processes it in the video range expander 14, stores it in the frame grabber 11, establishes a window and derives an intensity histogram of a subimage inside this window. From this is derived an adaptive threshold in 104, which is used to enhance the image of the object or objects against the background. The program then computes the area, $A_o$, the number of pixels in the bright portions of the object under scrutiny. A decision is then made in 105, as to whether the objects are separated, or jumbled and in contact with each other, based on operator input data. In the former, the no decision of 105 leads into a decision at 111 as to whether there remain other windows to be processed. If so, this cycle is repeated until all windows have been done in a similar fashion. If the last window has been processed the computer in 112 determines the mean area $\mu_A$ of the bright portions in all the windows as well as the standard deviation, $\delta_A$, of the areas, and computation is made of $\eta = \mu_A - Q_A \sigma_A$, which is the lower limit of tolerable area to be allowed during the operational mode. $Q_A$ is a scale factor. These data are stored in the computer memory. In 113, the x,y coordinates and the orientation of the selected objects are displayed on the monitors and the training data is checked for accuracy by the use of the operational mode of FIGS. 7A, 7B, and 7C. If the displayed object location and orientation data are inaccurate, successful acquisition of an object by the robot is not possible. The training cycle must then be repeated until successful acquisition can be attained and the appropriate data is stored in the computer for use during system operation to be described in connection with FIG. 7.

If, in 105, the decision is that the objects are in contact, the data is further processed in 106 by incrementing the threshold to reduce the areas of bright patches and thus enhance the separation of the edges of objects. The software performs the log gradient and subtracts high gradient points from the image. The remaining bright areas $A_1$ are now used to find a new ratio.

$$P_c = A_0/A_1$$

This process continues in 107, m times until the bright area is too small for further processing. ($P_{cm} > P_{cT}$ a preset threshold). Then, $P_{cm} = A_0/A_m$ is computed.

In order to ensure that the $P_c$ data is well above noise in 108, all further processing is done by returning to the data of the $m/2^{th}$ iteration (rounded to the nearest integer), since this data has been stored in memory. This is designated as $P_c$ optimum $= P_{co}$.

This process is repeated for other windows if the decision diamond 109 states "YES", until the "NO" branch is activated. This leads into 110 where the mean $P_c$ is calculated by summing the $P_{c's}$ for all the windows, and dividing by the number of windows, N. This results in:

$$\mu_P = \frac{1}{N} \sum_{K=1}^{N} P_{coK}$$

The standard deviation is $$\sigma = \sqrt{\frac{1}{N} \sum_{K=1}^{K=N} (P_{coK} - \mu_P)^2}$$

is also calculated and stored in memory as well.

Finally, a criterion of usable $P_c$ is defined as $$\eta_P = \mu + Q_P \sigma_P,$$

where $Q_P$ is a scale factor which may vary from 0.5 up to 2 or 3. The value of $Q_P$ is determined by the degree of risk of a resulting error in acquisition for large $Q_P$, compared to a reduction in the number of possible objects which the robot can be asked to acquire for a small $Q_P$. The exemplary equipment used $Q_P = 2$.

As in the previous case on non-contacting objects, the next step in 113 is to check the accuracy of acquisition as far as the vision system is concerned by calculating and displaying the location and orientation of selected objects which can successfully be acquired by the robot. If this has been accomplished, the training process is complete.

Figure 7B:
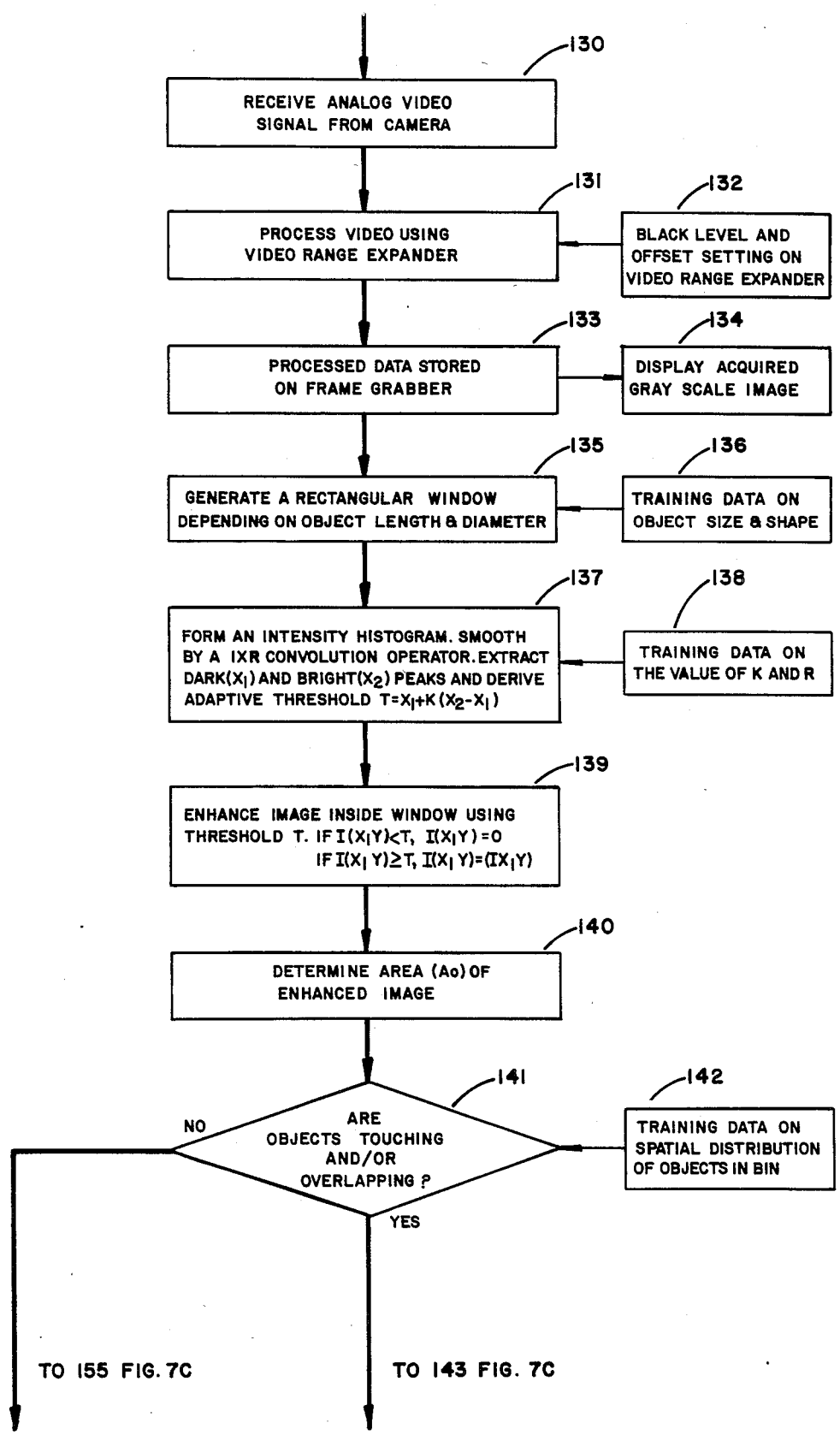
FIGS. 7B and 7C are flowcharts describing the image and data processing for randomly distributed objects which may be separated or touching.
Figure 7C:
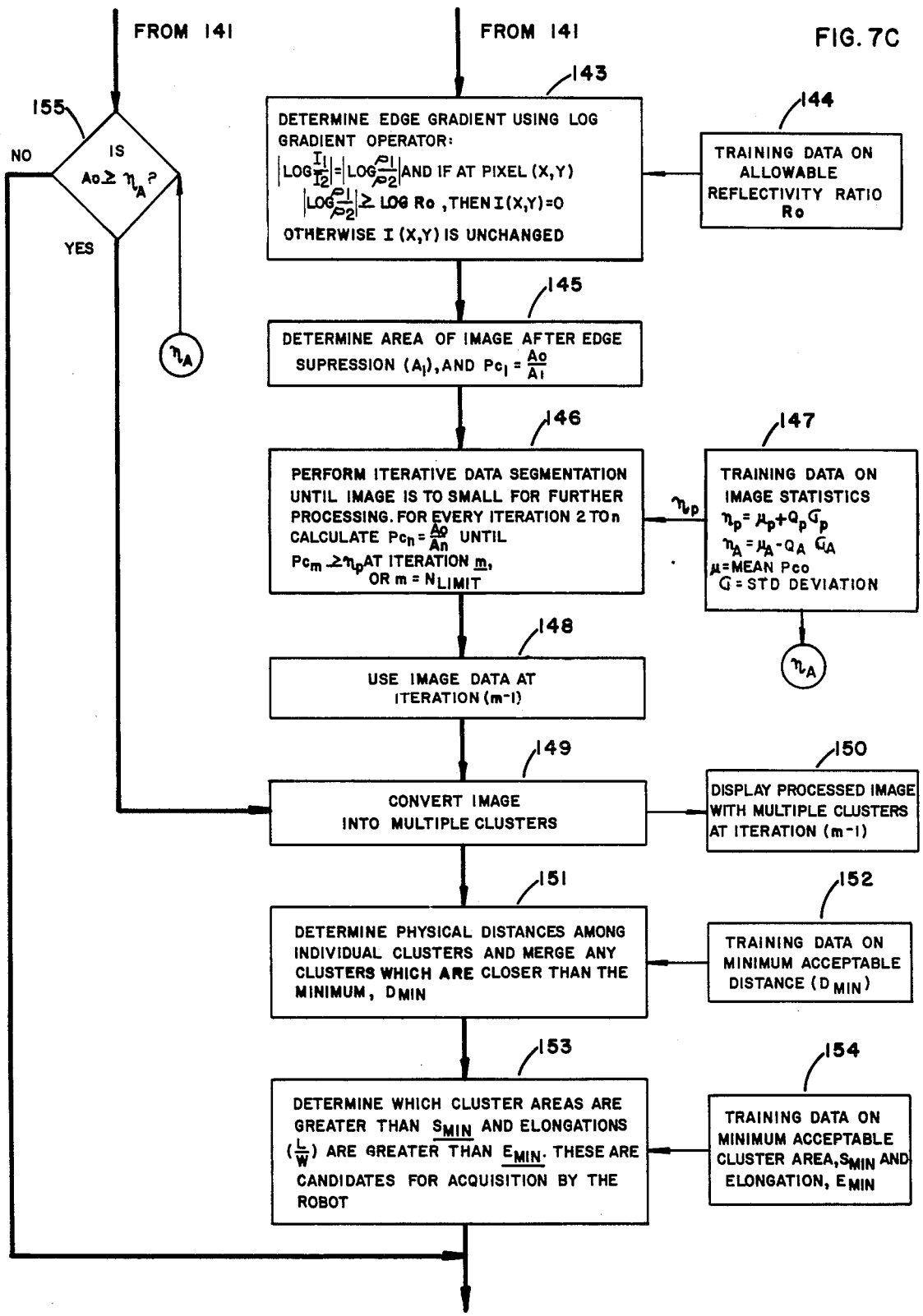
Figure 7D:
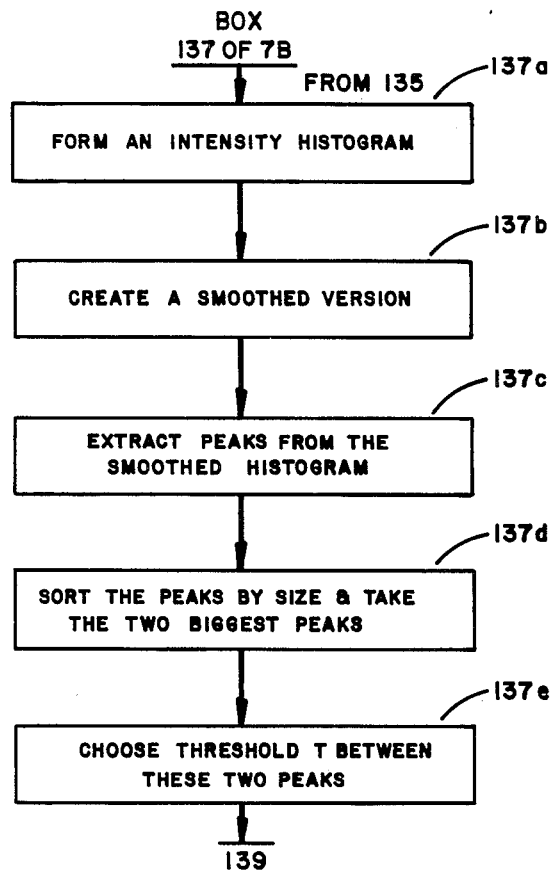
FIGS. 7D, 7E, and 7F are more detailed flowcharts of boxes in FIGS. 7B and 7C.
Figure 7E:
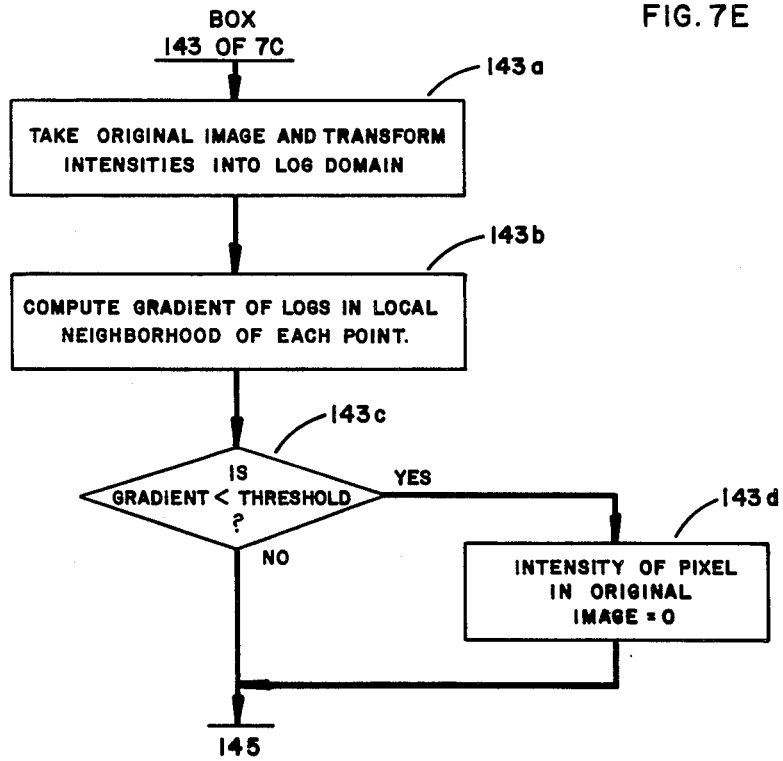

FIG. 7A is a flowchart of the operational phase of the equipment, showing in detail what is included in box 97 of FIG. 5, the total system diagram. The operational phase uses constants derived during the training phase of FIG. 6. FIGS. 7B and 7C show in greater detail what is included in box 117 of FIG. 7A.

In FIG. 7A, box 114 indicates that the robot arm is first moved out of the field of view of the camera which is located above the robot arm and looking down on the collection of objects in the bin. The decision diamond 115 checks to determine whether the robot gripper still carries an object from a previous operation. If "YES", the robot is directed to place the object on the receiving station, 116, which may be a moving belt, a rotating tabletop, or other mechanism to handle separated individual parts. The robot then remains out of the field of view and the camera in 117 takes a picture within a window and the complex signal processing of the scene to be described in FIGS. 7B and 7C takes place. During this process, a check is made of the contents of the bin at 118 and if it is empty the process stops until a new bin is moved into place. If parts are still in the bin, as indicated by the "NO" conclusion at 118, the robot arm is sent to the center of the bin at 119. In box 120, the processing in FIGS. 7B and 7C has progressed to the point where the x,y coordinates of the centers of area and the angles of orientation of a number of objects can be calculated and displayed on the monitor in 121. The robot is then checked at 122 for readiness to receive the data from 120. If not, the data is withheld until the "GO" signal is given at the "YES" output of 122 and then the location and orientation of the object having the largest area and satisfactory elongation ratio is sent to the robot controller in 124. The robot controller then directs the movement of the arm 125 and orients the gripper to properly grasp the object. The arm then descends into the bin until the selected object intercepts a light beam between the jaws of the gripper, as indicated in 126. Assuming that no collision has occurred, the photosensor will indicate a light cutoff by the presence of the object and this signal will trigger the jaws to close at 127. As the jaws close, pressure sensors will indicate the firmness of grasping the object between the jaws at 128, and assuming that the object is firmly grasped, the cycle is repeated, in that the arm in 114 is moved to deposit the object on the receiving station in 116 and the program activates the vision system as before with a new window covering a new area of objects.

If, however, the collision sensor was activated before the above procedure, the decision diamond 129 questions whether other qualified candidate objects are available. If "YES", then a loop is followed including boxes 122, 123, and 124, wherein the next best object's coordinates and orientation are transmitted to the robot controller and the aforementioned sequence is followed. If the answer to 129 is "NO", meaning that there are no remaining qualified candidates, a new cycle is initiated and the camera and system selects new objects within new windows, and this goes on until either the bin is empty or an operation stop is ordered.

The flowchart of FIG. 7B starts at 130 with the taking of a picture of the objects on the surface of the bin, and the feeding of the video signal to 131, where the video range expander, whose circuit is shown in FIG. 3A, processes it by using the stored information on black-level and offset setting information from 132 generated during the training phase of FIG. 6. This processed video is stored at 133 in the frame grabber. To ensure that the process is proceeding properly, the resulting gray scale image is displayed at 134 on the monitor.

Selection of differing system resolutions between large and small objects allows faster processing. Thus, for large objects, an 80×80 pixel window is sampled at half resolution (alternate pixels used), whereas for smaller objects a 40×40 window is sampled at full system resolution. Ideally, the diagonal of the window is adjusted to encompass the length of the object. Thus, the processing time which is a function of the number of pixels in the window is the same for both window sizes.

The program at 135 then generates a rectangular window whose size is dependent on the size and diameter data of the objects in the bin, which data at 136 had been stored in memory during training. At 137, using training data on K and R from 138, the processor produces a smoothed intensity histogram as described in connection with FIGS. 4A and 4B and as shown in greater detail in FIG. 7D. The value of K and R used in the operating example of the system were respectively 0.9 and 3. The values may vary over a range determined by the characteristics of the objects under scrutiny. The value of the threshold derived therefrom is used to enhance the image in 139. Each pixel intensity within the window, I(x,y), is compared against the threshold T. For each I(x,y), the intensity of reflected light inside the window, the following decision procedure is carried out to enhance the image:

If $I(x,y) \geq T$, then $I(x,y) = I(x,y)$ that is, it remains unchanged.

If $I(x,y) < T$, then $I(x,y) = 0$

The enhancement of the image in box 139 is accomplished by scanning across the image and comparing the brightness of each pixel with a threshold brightness T. The image is scanned by a window covering one pixel and the eight pixels adjacent to it, for example. These techniques involve scanning across the image with a pixel window of N×M dimensions (where N and M are odd), for example, a N=M=3 matrix. The magnitude of the central location light intensity in the matrix is set to "0" when the magnitude of light intensity at any of the locations in the matrix are less than a given threshold T. In the prior art when all these elements are above the threshold, a "1" is placed in the central location. This process is carried out iteratively until a certain criterion is satisfied involving the remaining non-zero points. This rule can also be inverted and applied to dark points on a light background. This process effectively enhances the contrast between bright and slightly darker illuminated areas and thus contributes to the separation of bright objects which touch but have a slightly shadowed area between them.

This process of using 0 and 1 is known in the art. The shortcoming of this prior art system arises from the fact that since intensities above the fixed threshold are replaced by a fixed number, such as "1", all gray scale information in the bright portions of the scene is lost. A significant improvement in the rate of effectively separating the objects in the scene is to retain the gray scale intensity values above the threshold and automatically and adaptively raise the threshold, T, in the next iteration and similarly in the following iterations. This results in more rapid convergence to a separated or segmented image and to a more accurate representation of the bright areas of the scene. As before, the process can be inverted (gray scale values below the threshold), for dark objects in a bright background.

FIG. 9 is a comparison of the two systems illustrating a more rapid convergence and separation of bright spots by the gray scale adaptive technique. Here, the original image 156 shows the pixel intensities in a given window.

In the conventional binary system 157 is the first iteration in data reduction by representing any level below the set threshold (18 units) as 0 and those above as a 1. In the second iteration 158 although the data has been reduced, the desired goal of separating the two centers of high brightness has not been achieved and a third iteration will be required.

In the case of the adaptive threshold gray scale system 159 using the same threshold of 18 units in the first iteration but retaining gray scale values, those below 18 are designated 0; those above are maintained as numerics. Recognizing that shifting the threshold, T, to 25 units in the second iteration would lead to a distinct separation of bright objects, this is done and the result, as shown in 160, has accomplished separation.

Figure 10A:
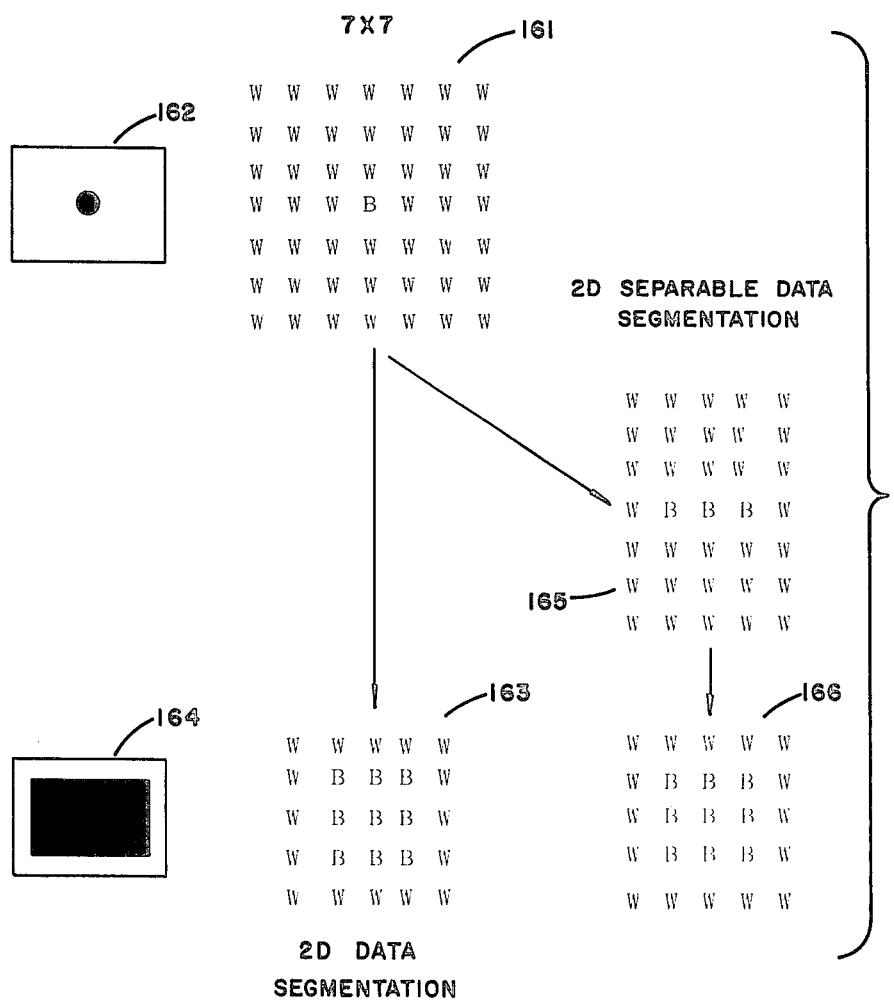
FIGS. 10A and 10B show an illustrated comparison of image pixels in a simultaneous two-dimensional data segmentation, and an improved separable or sequential two-dimensional data segmentation providing significant circuit simplification and cost reduction.
Figure 10B:
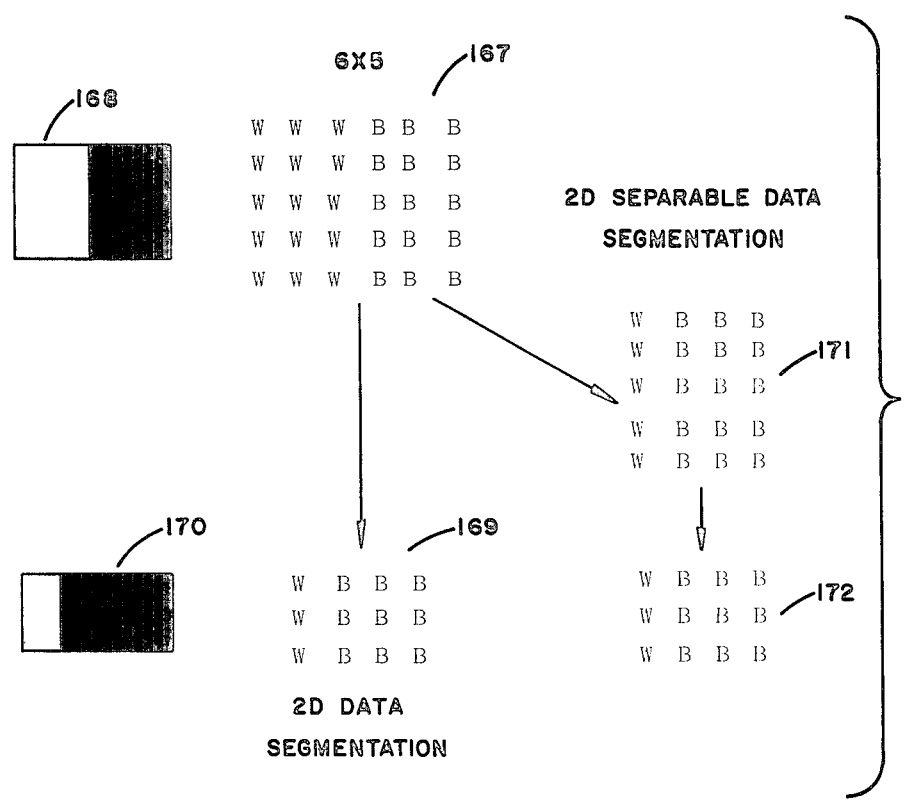

A further improved system, called separable data segmentation, can be used for reducing or segmenting lighter from darker regions in a scene with a considerable reduction of circuitry and consequent lower cost. It is estimated that for a 3×3 matrix the number of electrical components required is reduced approximately 50/1 by the 2D separable method shown in FIG. 10, over the simultaneous data segmentation method, despite the two step process involved. Two-dimensional separable data segmentation is accomplished by scanning and processing sequentially by rows, then by columns, rather than simultaneously on a two-dimensional or area basis, as has been done heretofore. A comparison of the simultaneous two-dimensional approach, versus the two-dimensional separable approach, is shown in FIGS. 10A and 10B. The former shows a black dot on a white field represented by B and W letters at 161, and represented pictorially at 162 of a 7×7 pixel square area. The area is converted to a black region surrounded by a peripheral white area as shown at 163 literally and pictorially at 164. This is an example of the process shown in FIG. 9.

In the two-dimensional separable data segmentation system, scanning is by a 1×N matrix window, first horizontally by rows, then vertically by columns, as shown on the right side of FIG. 10A. The result is seen to be identical to the two-dimensional approach, but the circuit implementation is much simpler despite the two step process. FIG. 10B shows a similar comparison for a 6×5 pixel area of a 50% black on 50% white scene, 167 through 172. Note that diagonal edges are also processed correctly by the separable technique.

Figure 11A:
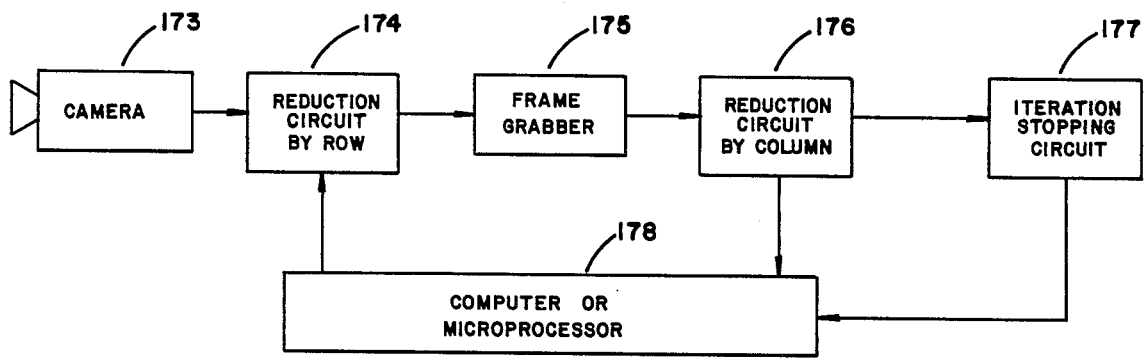
FIGS. 11A and 11B are block diagrams showing two implementations of separable, sequential, two-dimensional data segmentation techniques.
Figure 11B:
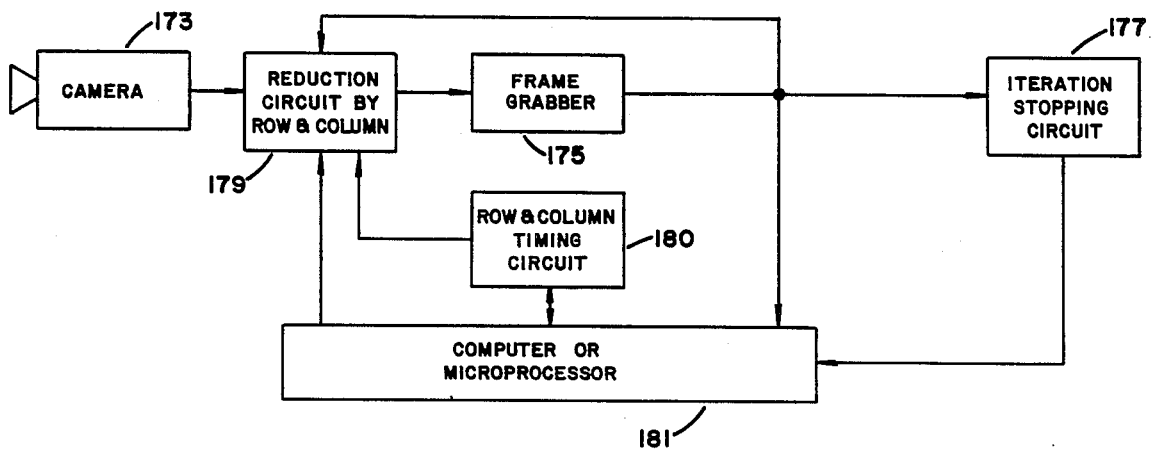

The two-dimensional separable system may be implemented as shown in FIGS. 11A and 11B. In FIG. 11A, the processed camera output 173 goes through one iteration of data segmentation by rows 174 and is passed onto a frame grabber 175. The latter is then scanned by columns at 176, and the result is stored in a computer at 178 and is also fed to an iteration stopping circuit 177.

There is, however, a limit on the total number of iterations in a practical system to insure adequate speed of processing. At each additional iteration the data is retrieved from memory in the computer and cycled through the circuit of FIG. 11A and stored in computer. When the above has been accomplished, the current data block is read out to the next stage of the image processing system.

FIG. 11B shows a simplification of FIG. 11A in which the reduction circuit by column is eliminated by using a row circuit for both row and column scanning since both circuits are similar. Except for some additional timed switching 180, and slight modification in the computer program 181 and 179, this step results in a significant cost and complexity reduction. Otherwise, the system operates similarly to FIG. 11A, with similar output.

Figure 11C:
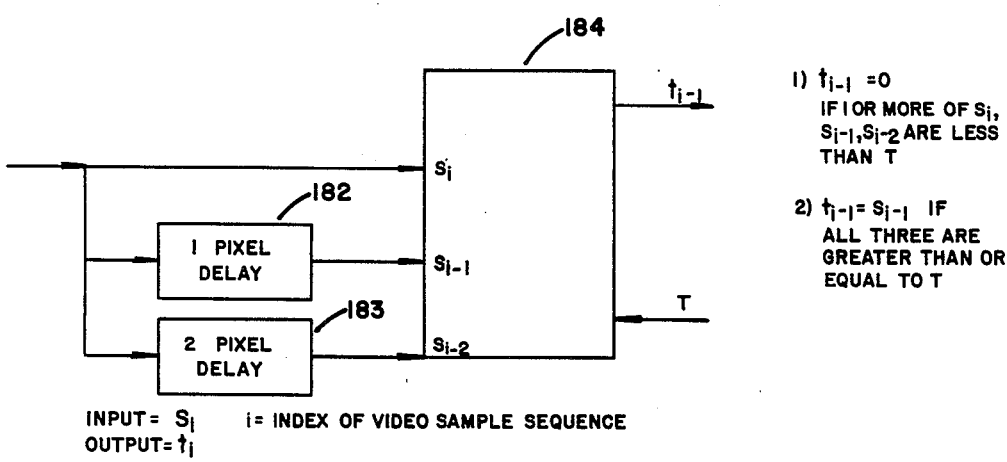
FIG. 11C is an illustration of a one-dimensional logic implementation of data segmentation using three successive pixels inputs.

FIG. 11C illustrates an example of one-dimensional implementation for three points, wherein the input is $S_i$, the output is $t_{i-1}$, where i is the index of video sample sequence and T is the threshold. The logic circuitry produces a result $t_{i-1}=0$, when one or more of $S_i$, $S_{i-1}$, $S_{i-2}$, are less than T. $t_{i-1}=S_{i-1}$, if all are equal to or greater than T. 182 and 183 are delay devices and 184 is a logic circuit.

The system of image enhancement described in connection with FIGS. 10 and 11 are useful in the box 139 of the FIG. 7B flowchart. The output of box 139 is an enhanced image of bright pixels each designated by $I(x_1y)$, and dark pixels each designated by a "0". The area of the bright image surface is calculated in 140. The decision diamond 141 to which is fed stored training data from 142, controls two alternative channels of further processing, one for touching and the other for non-touching or separated objects. The "YES" decision at 141 leads over the touching path to 143 in FIG. 7C, and the "NO" decision leads over the non-touching path to 155 in FIG. 7C.

Following the path for the touching objects, the operation in 143 of FIG. 7C utilizes the training data in 144 on allowable reflectivity ratio $R_o$. This ratio determines the possible variation in intensity for each pixel scanned and seeks an edge gradient as shown, using a logarithmic rather than a linear operator, to minimize the effects of variation in illumination $I_L$, and enhance low level signals. The functions in box 143 of FIG. 7C are shown in greater detail in FIG. 7E.

The principle of the log gradient is extended to gradient operators that cover a local neighborhood of multiple pixels, i.e., 3×3, 5×5, etc., neighborhoods. A particular example of such an application is to the Sobel operator.

In this case, the log of individual pixels can be taken before application of the operator where:

$$G(x,y) = |a| + |b|,$$

where

Figure 13:
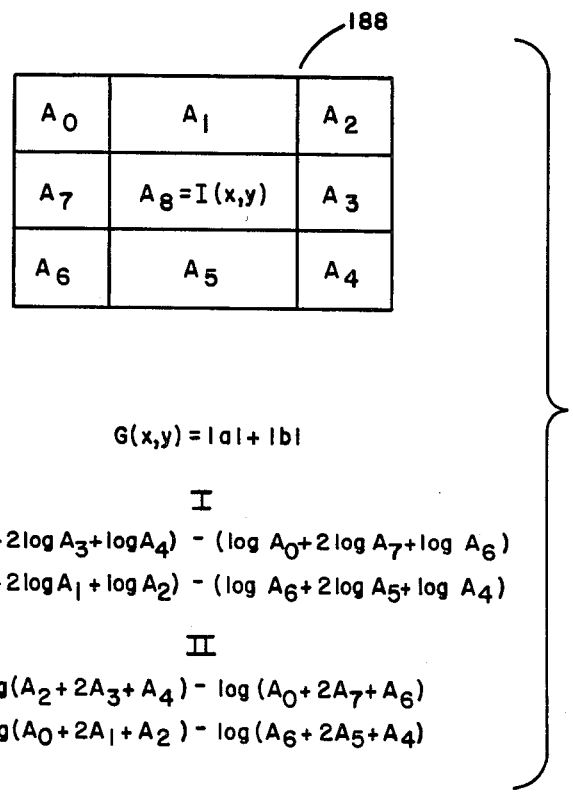
FIG. 13 illustrates the use of a Sobel operator on a 3×3 neighborhood of nine adjacent pixels in accomplishing data segmentation.

G(x,y) is the local intensity gradient as in FIG. 13-I. and $$a = (\log A_2 + 2\log A_3 + \log A_4) - (\log A_0 + 2\log A_7 + \log A_6),$$

and $$b = (\log A_0 + 2\log A_1 + \log A_2) - (\log A_6 + 2\log A_5 + \log A_4)$$

If $G(x,y) > \log R_o$, $I(x,y)=0$;
otherwise, $I(x_1y) = I(x_2y)$ and no edge exists.
Here, $A_8 = I(x,y)$ (FIG. 13), and $A_0, \ldots, A_7$ are the intensities of the 8 neighbors of pixel I(x,y).

The multiplicative nature of the operator, i.e., combining the terms $$a = \frac{\log(A_2 A_3^2 A_4)}{\log(A_0 A_1^2 A_6)} \text{ and } b = \frac{\log(A_0 A_1^2 A_2)}{\log(A_6 A_3^2 A_4)}$$

makes this very sensitive to small changes in pixel intensities and therefore would be very effective in detecting shallow intensity gradients between object boundaries.

However, the use of this operator makes the output very sensitive to the noise associated with the same scenes. In scenes with smooth objects and little background noise, this sensitivity is of little concern. However, when dealing with rough textured objects, an implementation with greater smoothing capability is preferred. An operator which reduces this sensitivity to extraneous noise is (FIG. 13-II):

$$a = \log(A_2 + 2A_3 + A_4) - \log(A_0 + 2A_7 + A_6)$$

$$b = \log(A_0 + 2A_1 + A_2) - \log(A_6 + 2A_5 + A_4)$$

The image is processed in 143 by a log gradient operator using the reflectivity reference ratio $R_o$, which has been obtained during the training procedure. This reflectivity ratio of adjacent pixels is used as a means of identifying an edge of the subimage within the window and is derived as follows:

It has been established that $\Delta I$ above a certain value $\Delta I_o$ is a criterion of an edge, i.e., $$\Delta I = |I(x_1 y) - I(x_2 y)| \geq \Delta I_o,$$

where $I(x_1 y)$ and $I(x_2 y)$ are the reflected light intensities from adjacent pixels along a scan line. The above intensity difference has a basic limitation in that the reflected intensity is dependent on the incident light, $I_L$, as follows:

$$I(x_1 y) = I_L \rho_1$$

and $$I(x_2 y) = I_L \rho_2,$$

where $\rho_1$ and $\rho_2$ are the effective reflectivities of adjacent pixels areas, and $$|I(x_1 y) - I(x_2 y)| = I_L(\rho_1 - \rho_2) = I_L \Delta \rho,$$

which must exceed $\Delta I_o$ for an edge.

The incident light may, however, vary during training and during operation thus causing edge decision errors. By using a log operator as shown below, this dependency on incident light $I_L$ is eliminated as follows:

$$|\log I_L(x_1 y) - \log I_L(x_2 y)| = \left|\log \frac{I_L \rho_1}{I_L \rho_2}\right| = \left|\log \frac{\rho_1}{\rho_2}\right| = \log |R|$$

which is independent of incident light and is dependent only on the ratio of effective reflectivities, assuming $I(x_2, y) \neq 0$. If $(x_2 y)$ does equal 0, it is set to 1 before applying the log operator.

If therefore, as a result of this processing the log gradient at point x,y is equal to or greater than the log of a reference reflectivity ratio $R_o$, an edge must exist at such point. These edges are suppressed by setting log $I(x,y) = 0$. When no edge exists log $I(x_1, y) = \log I(x_2, y)$, hence $I(x,y)$ is unchanged as scanning proceeds.

The "log gradient" operation puts the image data through a preliminary data segmentation procedure to provide significant separation of the objects for further steps in the acquisition of one of the objects.

The area of the bright portion of the image after edge suppression, $A_1$, is calculated at 145 and the $P_c$ ratio of the original area $A_0$ to $A_1$, is derived, $(P_{c1} = A_0/A_1)$.

Figure 7F:
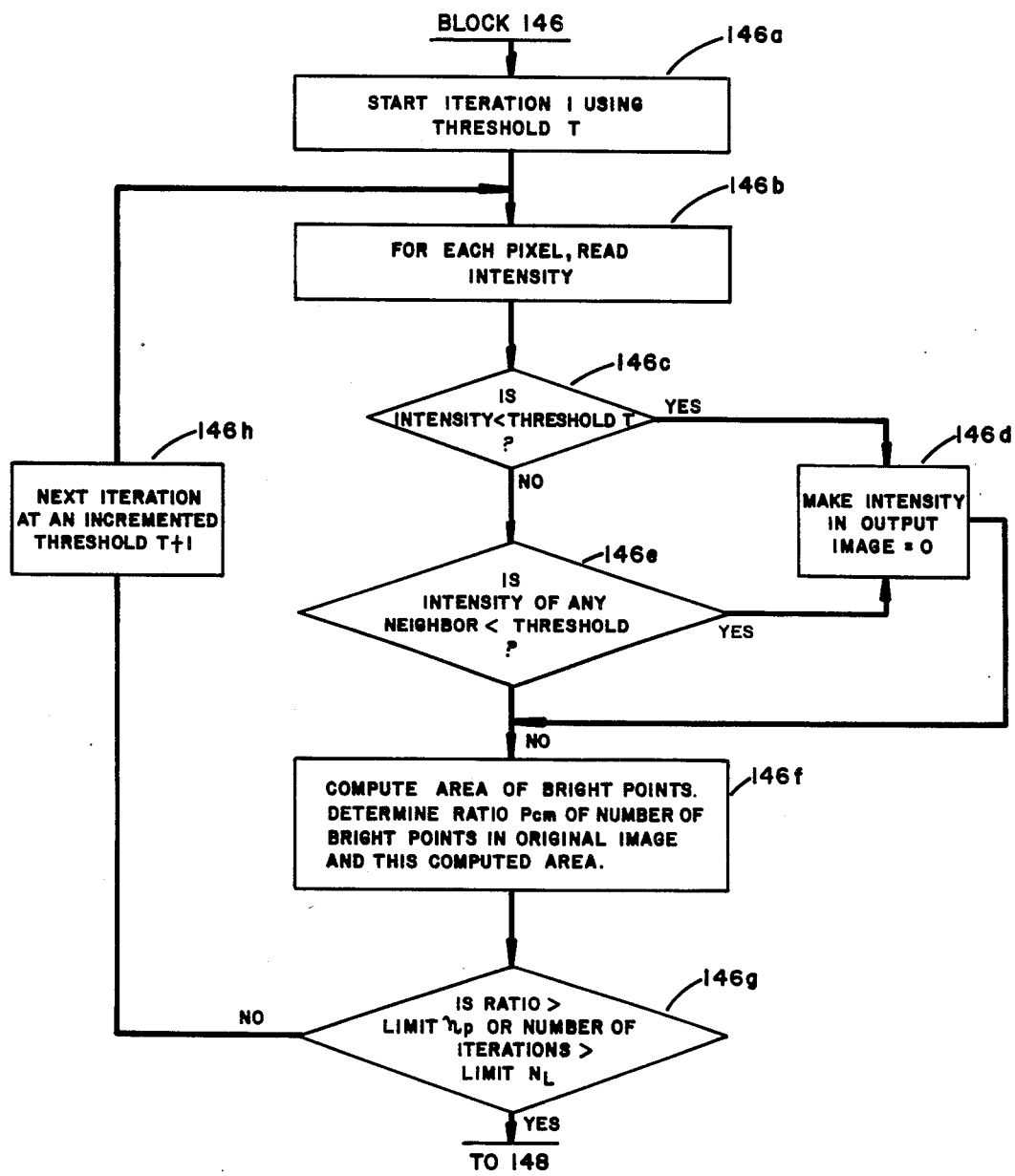

A data segmentation or shrinking process is repeatedly performed as shown at 146 of FIG. 7C, and in greater detail in FIG. 7F. The shrinking process is repeatedly performed until one of the following exists: (1) the image area reduction, as indicated by $P_{cm} = (A_0/A_m)$ resulting from an increasing threshold equals or exceeds $\eta_P$, i.e., $$\eta_P = \mu_P + Q_P \sigma_P,$$

which has been calculated during the training phase described in FIG. 6, and is fed from 147 into 146. Or, (2) the number of iterations $m = N_L$, which is a fixed limit such as 10 in the exemplary system. These limits prevent wasting computer time during object acquisition. Because the image at iteration m has too few usable bright areas, the data at the previous iteration, $m-1$, is selected and used at 148.

The program now collects the components of the image at the $m-1$ iteration at 148 into identified clusters at 149, and displays the multiple clusters on the monitor at 150. The data segmentation process when continued to the $m-1$ iteration may result in object images which are no longer continuous but are broken up into spots with intervening dark areas. These must be reconstructed into recognizable separated images. This is done in 151 with inputs from 152 which defines the minimum acceptable distance, $D_{min}$, between isolated pixels which are to be considered as part of different objects. These clusters are merged when they are closer than $D_{min}$ and form the basis for calculations of their centers of area and the angular orientations of their major axes in 120 of FIG. 7A.

There are, however, two further criteria which must be met by bright areas before being designated as candidates for acquisition by the robot. As shown in 153, the clusters must possess areas greater than a minimum value, $S_{min}$ and elongations ($E$ = Length/Width) greater than $E_{min}$, which have been established during the training phase 154 for elongated objects. Those clusters meeting these criteria are then identified to 120 in FIG. 7A for further computation.

If, however, the objects under scrutiny were initially separated but were desired to be oriented or handled on an individual basis, the processing can be considerably simplified as shown by the branch of the flow diagram beginning with the decision diamond 141 in FIG. 7B at the "NO" output which leads into 155 of FIG. 7C. Here, the decision diamond 155 asks the question whether the area $A_o$ computed in 140 is equal to or greater than $$\eta_A = \mu_A - Q_A \sigma_A,$$

which data is supplied by 147 in FIG. 7C from the training sequence of FIG. 6B. The area $\eta_A$ is the smallest area which could produce a satisfactory pattern for object location and orientation. If the answer is "NO", further processing is eliminated and the program instructs box 117 in FIG. 7A to go to the next window and seek a better object since the above data will lead to an unreliable acquisition. If, however, the "YES" answer is provided, the iteration process in 143, 145, 146 and 148 to separate the objects is unnecessary, and the output of decision diamond 155 leads directly to box 149. The rest of the cycle at 151 and 153 is similar to that of the contacting objects described previously.

Reference is now made to FIG. 12 for a description of a system to increase the speed and certainty of grasping either cylindrical or non-cylindrical objects located within a mass of similar objects of random orientation and in contact with each other.

Figure 12A:
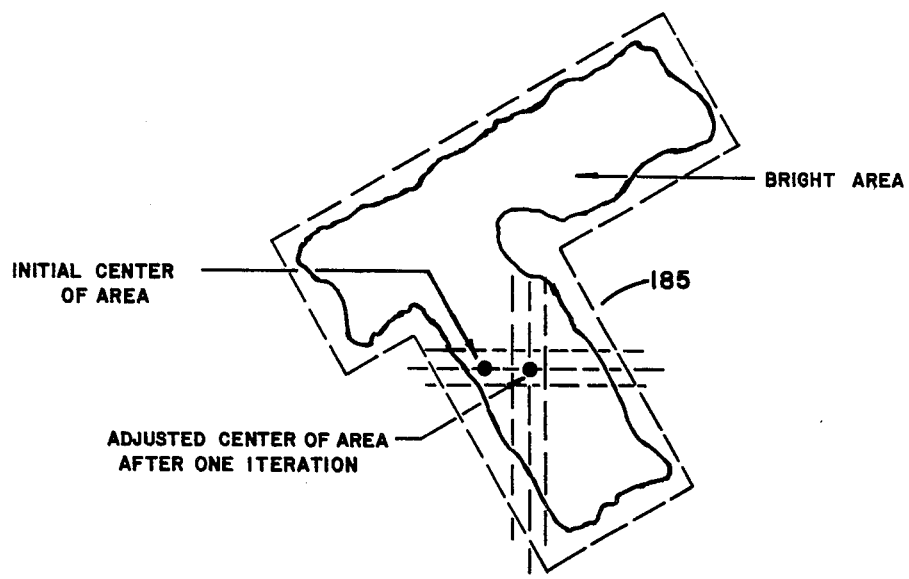
FIGS. 12A, 12B, and 12C will be referred to in describing means for determining the parallel jaw graspsite of an object of random shape, using the center of area rather than the center of gravity of the object.

In FIG. 12A, an exemplary object, 185, is shown which is to be grasped by a parallel jaw robot gripper or end effector. In the prior art, the center of gravity of the bright area was found, however, for many non-elongated objects, to fall outside the bright area of the object. On the other hand, the center of area of any object shape always falls within the lighted area of the object.

The adjusted center of area is first located in the neighborhood of the originally computed center of area of a body by averaging several scans in that neighborhood and the use of one or two iterations. One iteration consists of one set of horizontal and one set of vertical scans as shown in FIG. 12A. For each set of scans, the adjusted center of area is relocated at their average midpoint.

Figure 12B:
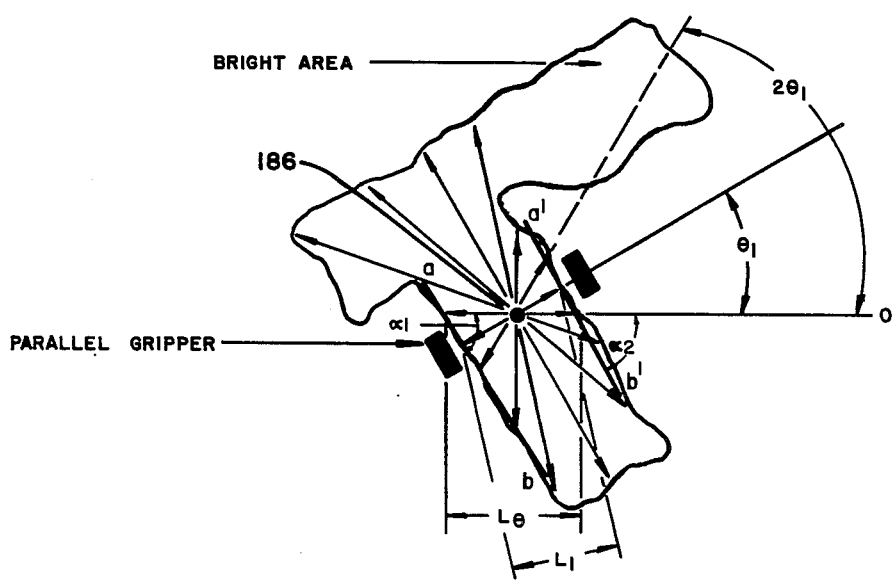
Figure 12C:
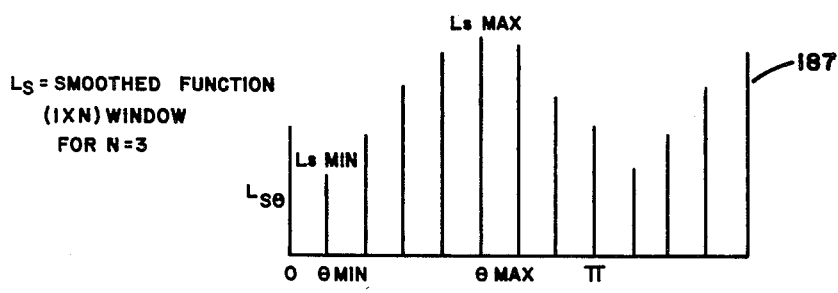

This is followed, in FIG. 12B, by taking polar scans through the corrected center of area 186 at increments of $\theta$ and determining the length $L_\theta$ for each scan, where $L_\theta$ is the distance from one edge of the bright area to the other edge, through the center of area as shown in the figure. $L_\theta$ is a periodic function with a period of $\pi$ radians. $L_\theta$ is then smoothed by a moving window, as for example a $1 \times 3$ matrix, to produce the function $L_{s\theta}$ as shown in FIG. 12C, 187. $L_{s\theta}$ minimum and $L_{s\theta}$ maximum are then found and the ratio $$E = \frac{L_{s\theta} \text{ MAX}}{L_{s\theta} \text{ MIN}} \text{ is calculated.}$$

If $E \geq E_o$, which is the specified elongation ratio for successful pickup, the signal is given to the robot to attempt pickup. If this ratio is less than $E_o$, the shape is wrong for successful pickup, so no pickup is attempted. Note that for non-elongated objects, this test can be eliminated.

In FIG. 12B it is evident that the faces of the gripper jaws are perpendicular to the $L_s$ Min direction and are centered around $L_s$ Min and pressing through the corrected center of area. To produce more precise values of $L_{s\theta}$ Min, the $\Delta\phi$ steps may be made smaller, with additional smoothing.

Another technique which can be used to determine whether the graspsite should be accepted or rejected by the parallel jaw gripper is to use dual line fitting using the end points of the scans in the vicinity of the shortest scan through the center of area. Lines ab and a'b' are drawn through the best fit of these end points in the vicinity of the center of area and are used to orient the parallel-jaw gripper. However, if $\alpha_1$ and $\alpha_2$ which are the angles which lines ab and a'b' make with the zero angle reference lines are considerably different, indicating a lack of parallelism, no attempt should be made to grasp the object by the parallel jaw gripper.

A further test can combine the information of both of these tests. It is evident that when a suction cup or magnetic pickup device is used instead of a parallel jaw gripper, the adjusted center of area itself provides sufficient data for successful pickup.

Figure 8:
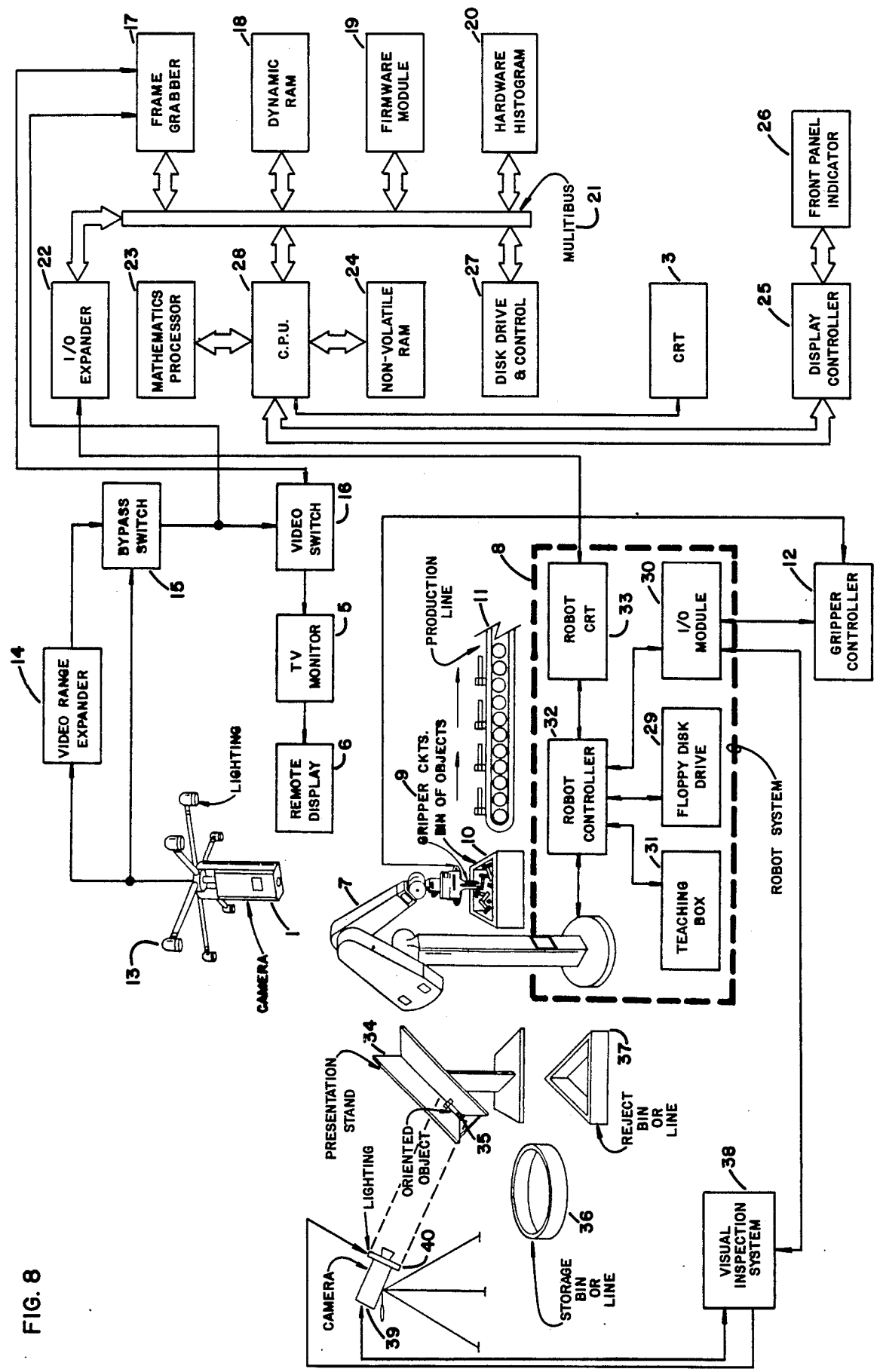
FIG. 8 is a diagram of the object acquisition system of FIG. 2, and in addition, an electro-optical system for inspecting objects acquired from a bin and distributing them to various receiving sites.

FIG. 8 is a diagram of the object acquisition system of FIG. 2 in combination with an electro-optical system for inspecting and transferring objects acquired by the system of FIG. 2. Means are provided for inspecting acquired objects for possible defects, and the distribution of such inspected parts into various receptacles or production lines based on the decision processes of the inspection system. A further function may consist in rotating the object into a specific orientation to expedite the production process. In FIG. 8, items 1 to 33 are identical to those in FIG. 2 both in arrangement and function. Items 34 to 40 constitute the added system. The robot 7 after having acquired an object 35 deposits it into the presentation stand 34 where it may be oriented in any one of two positions. Video camera 39 views the object 35 which is illuminated by a ring type lamp 40, for example, and feeds the video information into a visual inspection system such as the ORS "Scan-System 200" system, manufactured and sold by Object Recognition Systems, Inc., of 1101-B State Road, Princeton, N.J. 08540. The system incorporates stored information as to "good" objects as well as their proper orientation in the production line. Other arrangements for this intermediate step, such as a flat surface, can be used.

Electrical information from the "ScanSystem" input sensor is processed by a microcomputer in system 38. The resulting data is a digital feature-set uniquely representative of the original object. The microcomputer then mathematically compares this feature-set against other feature-sets previously stored in memory representing one or more objects or scenes. On a closest match basis, an identification is made which initiates a decision response controlling an on-line activity such as deflecting a defective part or sounding an alarm. A variety of other processing strategies may be selected by the operator to further enhance the ability of the "ScanSystem" to deal with a broad range of industrial visual process control requirements.

Information is fed to the robot controller system 8 which directs the robot to pick up the object 35 and deposit it into the proper receptacle 36 or 37 or production line 11 in the proper orientation. Having done so, the robot 7 returns to its bin picking operation as described herein and the cycle is repeated until the bin is empty.

What is claimed is:

1. A robot system for acquiring randomly-arranged workpieces, comprising
    a robot assembly including a hand, and a controller for controlling the movement of the hand to positions to successively grasp workpieces of given size and transfer them to a predetermined site,
    a video imaging device to provide a video signal representing a brightness image of the randomly-arranged workpieces, and
    a computer programmed to be responsive to the video signal from the imaging device and operative to modify the image, to compute a holdsite on a workpiece in the image, and to command the robot assembly to grasp the workpiece and transfer it to said predetermined site,
    said video imaging device including a video range expander for selecting and amplifying a range of video signal amplitudes between a gray threshold level and a white clipping level,
    said computer including program means to quantize the selected video signal having said range of amplitudes into digital pixels within a plurality of windows all having a size proportional to the size of the workpieces, said means to quantize the selected video signal including means to generate the same number of digital pixels of the image within the window regardless of the size of the window, and to enhance the quantized image by making all pixels having a brightness intensity less than a threshold intensity T equal to zero, and retaining the brightness intensities of all pixels above the threshold T, said threshold intensity T being computed by program from an intensity histogram so that T exceeds the intensity of the most numerous dark pixels by a predetermined fraction of the difference between the intensity of the most numerous dark pixels and the intensity of the most numerous bright pixels.

2. A system according to claim 1 wherein said computer includes program means to suppress the edges of the enhanced video image by reducing to zero all pixels whose brightness compared with the brightness of any adjacent pixel is greater than a predetermined ratio.

3. A system according to claim 2 wherein the brightness ratio of adjacent pixels is computed by determining the difference of the logarithms of the reflected intensities of the two pixels.

4. A system according to claim 2 wherein the brightness of each pixel is compared with the brightness of adjacent pixels along adjacent horizontal rows, and then the brightness of each pixel is compared with the brightness of adjacent pixels along adjacent vertical columns.

5. A system according to claim 1 wherein said computer includes program means to shrink the digitized image having an area A to an image having an area $A_n$ by making each pixel equal to zero which has an intensity less than a predetermined initial threshold, or which is adjacent to a pixel having an intensity less than the predetermined threshold.

6. A system according to claim 5 wherein said computer includes program means to repeat said shrinking with progressively higher thresholds until the ratio of the area A to the area $A_n$ exceeds a predetermined ratio.

7. A system according to claim 6 wherein said predetermined ratio of areas is computed during a training phase to be in the range from $\frac{1}{2}$ the standard deviation, to three times the standard deviation greater than the average ratio of areas found in all of said plurality of windows by progressively shrinking the images in the plurality of windows until the ratio of each initial area to each final area is greater than a predetermined training ratio.

8. A system according to claim 6 wherein the repetition of said shrinking is stopped if the number of repetitions exceeds a predetermined number.

9. A system according to claim 6 wherein said computer includes program means to go back to the image arrived at after an earlier than last one of said progressively shrunk images.

10. A system according to claim 9 wherein said computer includes program means to form clusters of bright pixels by adding bright pixels in spaces less than a predetermined minimum distance between existing bright pixels.

11. A system according to claim 10 wherein said computer includes program means to identify said clusters having an area greater than a predetermined minimum area.

12. A system according to claim 11 wherein said computer includes program means to identify said large clusters which also have a length-width ratio greater than a predetermined minimum.

13. A system according to claim 12 wherein said computer includes program means to compute the location of a central point and the orientation about that point of a grasp site on a workpiece represented by an identified large elongated cluster of pixels, and to command the robot assembly to grasp the workpiece and transfer it to a predetermined site.

14. A system according to claim 13 wherein said computer includes program means to compute the center of area of the cluster of pixels to determine the location of the grasp site, and to compute a minimum dimension of the cluster of pixels to determine the orientation of the grasp site.

15. A system according to claim 1 wherein said hand is a parallel-jaw gripper provided with means to limit the workpiece-gripping pressure in accordance with the amount of compression of the gripped workpiece.

16. A system according to claim 1, and in addition, a second video imaging device to provide a video signal representing a workpiece which has been transferred to said predetermined site, and computer means programmed to examine the video signal from said second video imaging device and to compare the examined image with a least one predetermined reference image, and to command said robot assembly to transfer the workpiece to a site for workpieces corresponding with said reference image, and to another different site for workpieces not corresponding with said reference image.

17. A robot system for acquiring non-touching randomly-arranged workpieces, comprising a robot assembly including a hand, and a controller for controlling the movement of the hand to positions to successively grasp workpieces of given size and transfer them to a predetermined site, a video imaging device to provide a video signal representing a brightness image of the randomly-arranged workpieces, and a computer programmed to be responsive to said video signal from the imaging device and operative to modify the image, to compute a holdsite on a workpiece in the image, and to command the robot assembly to grasp the workpiece and transfer it to said predetermined site, said video imaging device including a video range expander for selecting and amplifying a range of video signal amplitudes between a gray threshold level and a white coupling level, said computer including program means to quantize the selected video signal having said range of amplitudes into digital pixels within a plurality of windows all having a size proportioned to the size of the workpieces, program means to enhance the quantized image by making all pixels having a brightness intensity less than a threshold T equal to zero, and retaining the brightness intensities of all pixels above the threshold T, wherein said threshold intensity T is computed from an intensity histogram by program means which selects the threshold intensity T at a value intermediate that of the most numerous dark pixels and that of the most numerous bright pixels, and program means to determine whether the bright pixel area in a given window is greater than an area, computed during a training phase, which is in the range of ½ a standard deviation, to three standard deviations less than, the average of the areas found in all of said plurality of windows.

18. A system according to claim 17 wherein said computer includes program means to form clusters of bright pixels by adding bright pixels in spaces less than a predetermined minimum distance between existing bright pixels.

19. A system according to claim 18 wherein said computer includes program means to identify said clusters having an area greater than a predetermined minimum area.

20. A system according to claim 19 wherein said computer includes program means to identify said large clusters which also have a length-width ratio greater than a predetermined minimum.

21. A system according to claim 20 wherein said computer includes program means to compute the location and orientation of a grasp site on a workpiece represented by an identified large elongated cluster of pixels, and to command the robot assembly to grasp the workpiece and transfer it to a predetermined site.

22. A system according to claim 21 wherein said computer includes program means to compute the center of area of the cluster of pixels to determine the location of the grasp site, and to compute the axis of least moment of inertia of the cluster of pixels to determine the orientation of the grasp site.

23. The processing of a video image of randomly-arranged and touching workpiece of given size, comprising the steps of selecting and amplifying a range of video signal amplitudes between a gray threshold level and a white clipping level, quantizing the selected video signal, having said range of amplitudes, within a window having a size proportional to the size of the workpieces, enhancing the digitized video image by making all pixels having a brightness intensity less than a threshold T equal to zero, where the threshold T is computed from an intensity histogram by means of a computer program which selects the threshold intensity T at a value intermediate that of the most numerous dark pixels and that of the most numerous bright pixels, suppressing the edges in the enhanced video image by reducing to zero all pixels whose brightness compared with the brightness of any adjacent pixel is greater than a predetermined ratio R, shrinking the edge-suppressed image having an area A to an image having an area $A_n$ by making equal to zero each pixel which has an intensity less than a predetermined initial threshold, or which is adjacent to a pixel having an intensity less than the predetermined threshold, repeating said shrinking with progressively higher thresholds until the ratio of the area A to the area $A_n$ is larger than a predetermined limit ratio, or until a predetermined number of iterations is exceeded, identifying clusters each consisting of adjacent bright pixel in a earlier than the last one of the progressively shrunk images, merging clusters of bright pixels by adding bright pixels in spaces which are less than a predetermined minimum distance between existing bright pixels, identifying merged clusters having areas greater than a predetermined minimum, and having a length-width ratio greater than a predetermined minimum, and computing a grasp location and orientation of an identified cluster.

24. The processing of a video image of randomly-arranged non-touching workpieces of given size, comprising the steps of selecting and amplifying a range of video signal amplitudes between a gray threshold level and a white clipping level, quantizing the selected video signal, having said range of amplitudes, within a window having a size proportional to the size of the workpieces, enhancing the digitized video image by making all pixels having a brightness intensity less than a threshold T equal to zero, where the threshold T is computed from an intensity histogram by means of a computer program which selects the threshold intensity T at a value intermediate that of the most numerous dark pixels and that of the most numerous bright pixels, identifying clusters each consisting of adjacent bright pixels, merging clusters of bright pixels adding bright pixels in spaces which are less than a predetermined minimum distance between existing bright pixels, identifying merged clusters having areas greater than a predetermined minimum, and having a length-width ratio greater than a predetermined minimum, and computing a grasp location and orientation of an identified cluster.

25. A robot system for acquiring randomly-arranged workpieces of given size, comprising a robot assembly including a hand, and a controller for controlling the movement of the hand to positions to successively grasp workpieces and transfer them to a predetermined site, a video imaging device to provide a video signal representing a brightness image of the randomly-arranged workpieces, and a computer programmed to be responsive to the video signal from the imaging device and operative to modify the image, to compute a holdsite on a workpiece in the image, and to command the robot assembly to grasp the workpiece and transfer it to said predetermined site, said video imaging device including a video range expander for selecting and amplifying a range of video signal amplitudes between a gray threshold level and a white clipping level, said computer including program means to quantize the selected video signal having said range of amplitudes into digital pixels within a plurality of windows all having a size proportioned to the size of the workpieces, program means to enhance the quantized image by making all pixels having a brightness intensity less than a threshold T equal to zero, and retaining the brightness intensities of all pixels above the threshold T, program means to form clusters of bright pixels by adding bright pixels in spaces less than a predetermined minimum distance between existing bright pixels, program means to identify said clusters having an area greater than a predetermined minimum area, program means to identify said large clusters which also have a length-width ratio greater than a predetermined minimum, program means to compute the location and orientation of a grasp site on a workpiece represented by an identified large elongated cluster of pixels, and to command the robot assembly to grasp the workpiece and transfer it to a predetermined site, and program means to compute the center of area of the cluster of pixels to determine the location of the grasp site, and to compute the axis of least moment of inertia of the cluster of pixels to determine the orientation of the grasp site.

26. A system according to claim 25 wherein the computation of the center of area of pixels includes computing an initial center of area by finding the location of the pixel which occurs half way on a rasterscan through the cluster of bright pixels, and computing a corrected center of area by averaging the bright pixels on a small plurality of horizontal and vertical scans passing in the immediate vicinity of said initial center of area.

27. A system according to claim 26 and in addition the computation of a minimum dimension of the cluster of pixels by taking polar scans through said corrected center of area at angular increments, finding the scan length dimensions of the cluster of pixels under each polar scan line, smoothing the lengths with a moving window, and selecting a polar angle of the shortest scan line dimension for the needed angular orientation of the robot hand over the grasp site.

28. A system according to claim 27 wherein the robot assembly is commanded to grasp the workpiece only if said shortest scan line dimension is less than the maximum open dimension of the robot hand.

29. A system according to claim 28 wherein the robot assembly is commanded to grasp the workpiece only if the ratio of said shortest scan line dimension to the longest scan line dimension is less than a predetermined value.

30. A system according to claim 27 where the robot assembly is commanded to grasp the workpiece only if the endpoints of a plurality of scan line dimensions near said shortest scan line dimension define lines having at least a predetermined degree of parallelism.

* * * * *